United States Patent
Kim et al.

(10) Patent No.: US 7,369,862 B2
(45) Date of Patent: May 6, 2008

(54) METHOD AND SYSTEM FOR PROVIDING DATA SERVICES TO MOBILE COMMUNICATION TERMINALS AND MOBILE COMMUNICATION TERMINAL THEREFOR

(75) Inventors: Haeng-Woo Kim, Kwangmyeong-shi (KR); Soon-Hyun Kwon, Suwon-shi (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 778 days.

(21) Appl. No.: 10/792,885

(22) Filed: Mar. 5, 2004

(65) Prior Publication Data

US 2004/0185874 A1 Sep. 23, 2004

(30) Foreign Application Priority Data

Mar. 7, 2003 (KR) .................. 10-2003-0014497
Jul. 29, 2003 (KR) .................. 10-2003-0052203

(51) Int. Cl.
*H04Q 7/20* (2006.01)

(52) U.S. Cl. .............. 455/456.3; 455/456.1; 455/435.1; 455/435.2

(58) Field of Classification Search ............ 455/456.3, 455/456.1, 565, 574, 527, 435.1, 435.2, 435.3, 455/414.1, 414.2, 414.3
See application file for complete search history.

(56) References Cited

U.S. PATENT DOCUMENTS

| | | | |
|---|---|---|---|
| 6,011,976 A | 1/2000 | Michaels et al. | |
| 6,181,935 B1 | 1/2001 | Gossman et al. | |
| 6,212,175 B1 | 4/2001 | Harsch | |
| 6,223,055 B1* | 4/2001 | Cyr ......................... | 455/555 |
| 6,314,165 B1* | 11/2001 | Junqua et al. ............ | 379/88.03 |
| 6,353,863 B1 | 3/2002 | Nakagawa et al. | |
| 7,088,698 B1* | 8/2006 | Harsch ..................... | 370/338 |
| 7,120,135 B2* | 10/2006 | Kim ......................... | 370/329 |
| 2001/0046215 A1 | 11/2001 | Kim | |
| 2002/0049640 A1 | 4/2002 | Sheriff et al. | |

(Continued)

FOREIGN PATENT DOCUMENTS

GB 1 133 119 A2 9/2001

(Continued)

OTHER PUBLICATIONS

European Search Report; Application No. EP 04 00 5308; Jul. 12, 2004.

(Continued)

*Primary Examiner*—Melur Ramakrishnaiah
(74) *Attorney, Agent, or Firm*—Robert E. Bushnell, Esq.

(57) ABSTRACT

A method, a system and a mobile terminal for providing data services, whereby specific data services according to a zone of a precinct wireless network are conveniently provided to mobile terminal subscribers in the precinct wireless network, while preventing the maintenance of an unnecessary connection of the terminal to the precinct wireless network. When a mobile terminal enters the precinct wireless network, at least one application program corresponding to a predetermined data service function of the mobile terminal is automatically executed, and thereafter when the terminal exits the precinct wireless network, the application program is automatically terminated. In addition, the terminal opens a data channel connection with the precinct wireless network only when the data service is currently executed in it.

37 Claims, 18 Drawing Sheets

U.S. PATENT DOCUMENTS

2003/0045322 A1 3/2003 Baer et al.

FOREIGN PATENT DOCUMENTS

| GB | 1 133 119 A3 | 9/2001 |
| JP | 2003-18579 | 1/2003 |
| WO | WO 02/25823 A2 | 3/2002 |
| WO | WO 02/25823 A3 | 3/2002 |

OTHER PUBLICATIONS

*Office Action* from the State Intellectual Property Office of People's Republic of China issued in Applicant's corresponding Chinese Patent Application No. 200410007752.7 dated May 13, 2005.

Japanese Office action corresponding to Japanese Patent Application No. 2004-064705, issued on Mar. 15, 2007.

*Search report* from the Canadian Intellectual Property Office issued in Applicant's corresponding Canadian Patent Application No. 2,460,110 dated Aug. 21, 2007.

* cited by examiner

METHOD AND SYSTEM FOR PROVIDING DATA SERVICES TO MOBILE COMMUNICATION TERMINALS AND MOBILE COMMUNICATION TERMINAL THEREFOR

CLAIM OF PRIORITY

This application makes reference to and claims all benefits accruing under 35 U.S.C §119 from an application entitled "METHOD AND SYSTEM FOR PROVIDING VALUE ADDED DATA SERVICES TO MOBILE COMMUNICATION TERMINALS AND MOBILE COMMUNICATION TERMINAL THEREFOR", filed in the Korean Intellectual Property Office on Mar. 7, 2003 and assigned Ser. No. 2003-14497, and an application entitled "METHOD AND SYSTEM FOR PROVIDING VALUE ADDED DATA SERVICES TO MOBILE COMMUNICATION TERMINALS AND MOBILE COMMUNICATION TERMINAL THEREFOR", filed in the Korean Intellectual Property Office on Jul. 29, 2003 and assigned Ser. No. 2003-52203.

BACKGROUND OF THE INVENTION

1. Field of the Invention

The present invention relates to services for mobile communication terminals, and more particularly to a method and system for providing data services to mobile communication terminal subscribers.

2. Description of the Related Art

The recent trend is that subscribers of mobile communication terminals, such as a mobile phone and a PDA (Personal Digital Assistant) having a communication module, increasingly use an integrated voice and data service rather than a voice service alone. Accordingly, data services carrying various content or message transmission/reception services are currently provided to mobile communication terminals through a mobile communication network.

Mobile communication carriers, which provide mobile communication services through a PLMN (Public Land Mobile Network), give differential services in terms of fees, etc., to a specific zone such as a college town crowded with students, in consideration of the characteristics of mobile terminal subscribers visiting the zone, in an attempt to secure new customers or improve income.

A private mobile network established in an indoor place such as a specific building or business place, or an outdoor limited zone, allows registered mobile communication terminals to receive mobile communication services or use them between each other in the range of the private mobile network without going through the PLMN. That is, in such a private mobile network, the registered terminals can perform mobile communication between each other without going through the PLMN.

The private mobile network also interworks with the PLMN, so that a mobile communication terminal can receive mobile communication services through the PLMN as well as through the private mobile network. One example of such a private mobile network can be seen in Korean Patent Publication No. 2001-0107028 entitled "System and Method for Providing Mobile Communication Services for Public and Private Uses," which was filed in the Korean Intellectual Property Office on May 24, 2000 by this Applicant, Samsung Electronics Co., Ltd., and laid open on Dec. 7, 2001.

The private mobile network or a mobile communication network for providing differential mobile communication services to mobile communication terminals in a specific zone is a kind of wireless network used in a limited zone and thus can be regarded as a precinct wireless network. If specific data services, according to the characteristics of a zone where such a precinct wireless network is installed, are provided free or at a fixed rate to the mobile communication terminal subscribers, it will not only provide convenience to the subscribers but also be very effective in securing new customers or improving income. It can be considered to provide an instant messenger service generally called a "messenger service," as an example of such a specific data service, so that the subscribers can use the service between each other in the service range of the precinct wireless network.

In the meantime, a brief description will now be given of the processes performed by the precinct wireless network in order to allow the subscribers to receive the data service through the network.

When a mobile terminal subscriber located in the precinct wireless network executes an application program for data services, employed in his or her mobile communication terminal, the program executes a network connection program according to a predetermined communication environment. The execution of the network connection program enables the terminal to make a connection to the precinct wireless network and secure a data channel of the network. The terminal interworks with a data service server by communication through the data channel of the precinct wireless network so as to provide a data service to the subscriber. The data service server is a server for providing data services that mobile communication terminal subscribers may use.

Generally, as desired, the subscriber performs the data service function employed in the mobile communication terminal, as described above, so as to use the data service. However, if the subscriber wants to use a data service, differentially provided according to the characteristics of a zone where a specific precinct wireless network is operating, the subscriber himself or herself must not only check whether his or her terminal has entered the zone, but must also execute the application program for data services even after having entered the zone. Similarly, when the terminal exits the precinct wireless network zone, the subscriber must inconveniently terminate the application program.

In the meantime, once a network application program employed in a mobile communication terminal for use in a mobile communication network or a private mobile network is executed, it maintains the network connection even when the application program for data services is not in operation. The network connection maintenance leads to an unnecessary load on communication network resources that must be shared with other users. This reduces the system efficiency to bring about the needed increase in system capacity.

SUMMARY OF THE INVENTION

Therefore, the present invention has been made in view of the above problems, and it is an object of the present invention to provide a method, a system and a mobile communication terminal for providing data services, whereby specific data services according to the zone of a precinct wireless network are conveniently provided to mobile communication terminal subscribers in the precinct wireless network.

It is another object of the present invention to provide a method and system for providing data services and a mobile communication terminal therefor, whereby it is possible to prevent the maintenance of an unnecessary connection of a mobile communication terminal to a precinct wireless network in the provision of data services to mobile communication terminal subscribers in the precinct wireless network.

In accordance with the present invention, the above and other objects can be accomplished by the provision of a method and system for providing data services and a mobile communication terminal therefor, wherein when a mobile communication terminal enters a precinct wireless network, at least one predetermined data service function of the mobile communication terminal is automatically executed, and thereafter when the terminal exits the precinct wireless network, the data service function is automatically terminated. In addition, the mobile communication terminal opens a data channel connection with the precinct wireless network only when the data service is currently executed in it.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
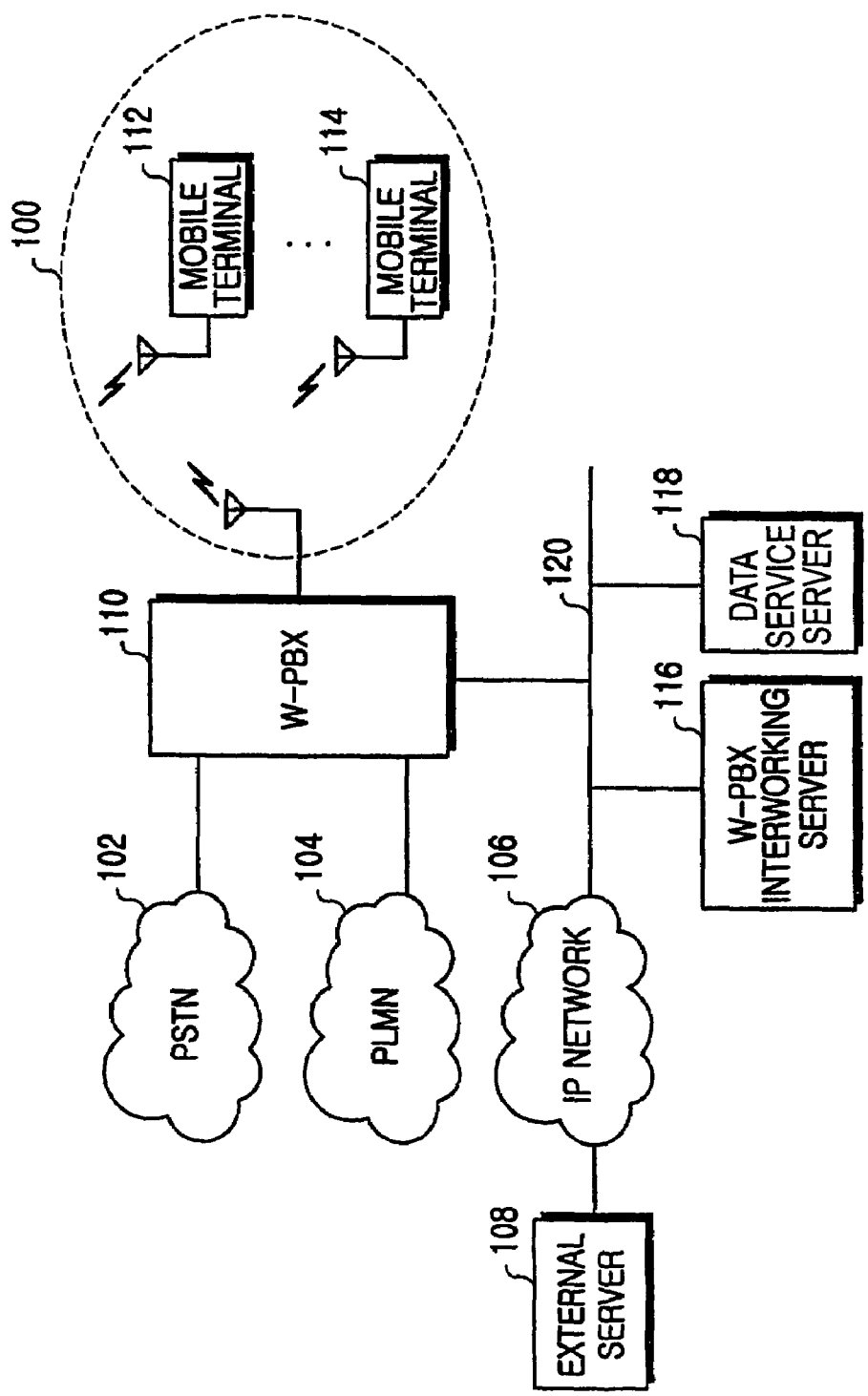
FIG. 1 shows the configuration of a network for providing data services according to an embodiment of the present invention.

Now, preferred embodiments of the present invention will be described in detail with reference to the annexed drawings. In the following description, a detailed description of known functions and configurations incorporated herein will be omitted when it may make the subject matter of the present invention rather unclear. In the drawings, the same or similar elements are denoted by the same reference numerals even though they are depicted in different drawings.

FIG. 1 shows the configuration of a network for providing data services according to an embodiment of the present invention. That is, this figure illustrates an example of a precinct wireless network in which mobile communication services are provided through a W-PBX (Wireless-Private Branch Exchange) 110 connected to both a PSTN (Public Switched Telephone Network) 102 and a PLMN (Public Land Mobile Network) 104.

Although the present invention will be described with reference to the W-PBX 110, such a description is not intended to limit the present invention, but is simply provided for illustrative purposes. In other words, it will be fully appreciated by those skilled in the art that the present invention may be adapted to another system having similar or alternative elements, for example, various kinds of similar systems such as an AP (Access Point) of a WLAN (Wireless Local Area Network), which provides a high-speed wireless data access environment in a desired region, and a hybrid WLAN and PBX system. Accordingly, the term "W-PBX" used in this specification should not be construed as a restrictive term indicating a specific system configuration.

The W-PBX 110 typically includes a private base station controller, a private base transceiver station, and a private home location register/visitor location register, although they are not shown in FIG. 1. The W-PBX 110 provides mobile communication services, including a telephone communication, a data communication, an SMS (Short Message Service), etc., to mobile communication terminals 112 and 114 located in a private mobile network zone where private mobile network services are available, i.e. located in the range of the precinct wireless network 100. The W-PBX 110 broadcasts a precinct network recognition signal for informing the terminals 112 and 114 entering the network 100 that they have entered the network 100.

When the terminals 112 and 114 enter the precinct wireless network 100, they receive precinct network recognition signals broadcasted from the W-PBX 110, then recognize their entrance into the region of the precinct wireless network 100, and then request a location registration from the W-PBX 110.

When the terminals 112 and 114 enter the network 100 and request the location registration, the W-PBX 110 checks whether the terminals 112 and 114 are ones registered in the precinct wireless network 100. The W-PBX 110 informs the terminals 112 and 114 that they have entered the network 100 in response to the location registration request, if they are registered terminals. In response to this notification, the terminals 112 and 114 notify their users, through a display device, that they have entered the precinct wireless network.

Thereafter, if the terminals 112 and 114 exit the network 100, they do not receive the precinct network recognition signals broadcasted from the W-PBX 110 any longer. Then, the mobile communication terminals 112 and 114 recognize that they are no longer receiving the precinct network recognition signals, and inform their users of having exited the precinct wireless network 100, through a display device.

The W-PBX 110 is connected to an external network, for example, an IP (Internet Protocol) network 106 such as the Internet through a LAN (Local Area Network) 120. A W-PBX interworking server 116 and a data service server 118 are connected to the W-PBX 110 through the LAN 120.

The data service server 118 is a server based on a client/server model that provides data services to the terminals 112 and 114 as its clients. The server 118 may be a messenger server, a stock transaction server, a room service server, a real time news server, etc., which will described with respect to FIGS. 6-18.

Such a data service server 118 can interwork with various external servers 108 through the IP network 106. In addition, the W-PBX interworking server 116 permits the data service server 118 to interwork with the W-PBX 110.

For example, a system named "InfoMobile" that the Korean Samsung Electronics Co., Ltd. has developed and is selling can be used as the above W-PBX 110. However, it will be appreciated by those skilled in the art that the present invention is not limited to such a specific system but the spirit of the present invention can be applied to any other systems having similar functions in a similar manner.

The mobile communication terminals 112 and 114, according to the present invention, automatically execute a data service function, preset by a precinct network operator, by a terminal manufacturer, or by each user of the terminals 112 and 114, in response to the precinct network entrance notification that is received from the W-PBX 110 as described above. Thereafter, if they do not receive the precinct network recognition signal, the terminals 112 and 114 automatically terminate the executed data service function. Each user of the terminals 112 and 114 can set or release the automatic activation of the data service function. Of course, in the case where the terminals 112 and 114 have a plurality of data service functions, it is possible to set or release the automatic execution option of each of the service functions.

Figure 2:
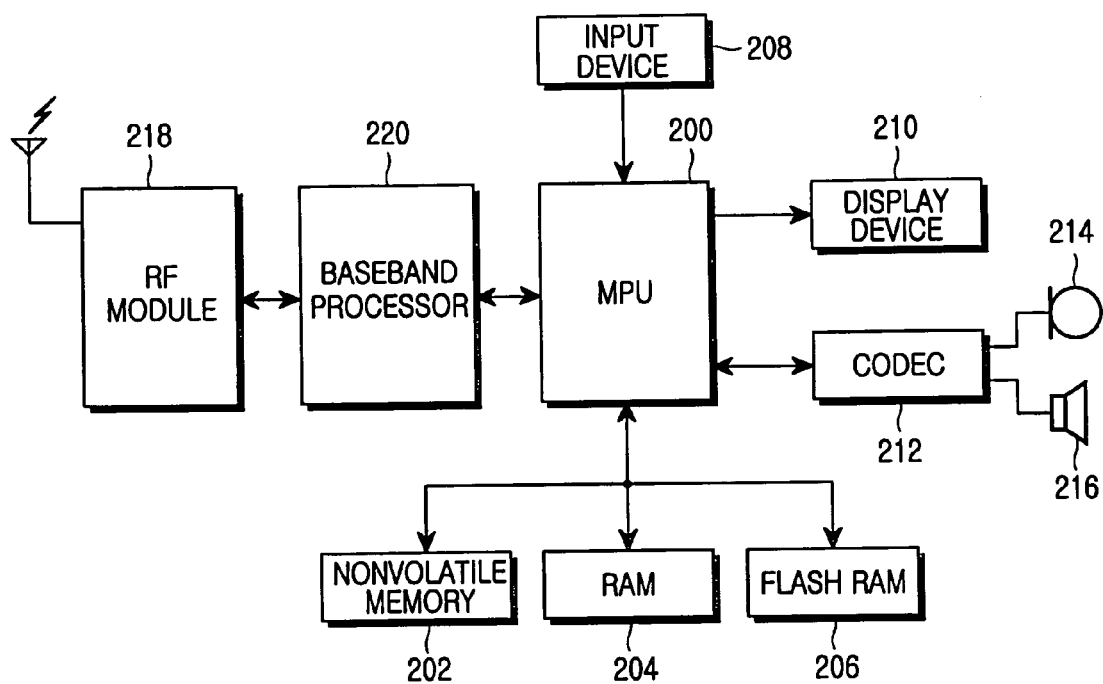
FIG. 2 is a block diagram showing a mobile communication terminal to which the present invention is applied.

FIG. 2 is a block diagram showing an example of a mobile communication terminal to which the present invention can be applied. This terminal may include any type of terminal if it has a configuration that supports a wireless data communication function to enable it to access the W-PBX 110, such as a mobile phone, a smart phone, a PDA (Personal Digital Assistant), a notebook computer, a laptop computer, a palmtop computer and a pocket PC (Personal Computer) which support a wireless data communication function. FIG. 2 shows a typical configuration example of such a terminal, and it should be noted that the shown configuration is not intended to limit the configuration of terminals to which the present invention can be applied.

In FIG. 2, an MPU (Micro Processor Unit) 200 is a block for processing and controlling telephone communication or messages, or data communication. The MPU 200 processes a data service function according to the present invention as described below as well as the conventional functions. A nonvolatile memory 202, for which, for example, a flash memory or ROM (Read Only Memory) may be used, stores a microcode of a program for the processing and control of the MPU 200, and various reference data. A RAM (Random Access Memory) 204 is provided as a working memory of the MPU 200. A flash RAM 206 provides a region for storing various updateable storage data. An input device 208 includes number keys from 0 to 9, and various function keys such as "*", "#", "menu", "message", "OK", "send", "delete", "PW on/off", and "volume". In order to provide input data of a user to the MPU 200, the input device 208 includes at least one of a key pad for providing key input data corresponding to a key pushed by the user, a character recognition device for providing the input data by recognizing characters inputted through a stylus, and a computer keyboard, or a voice recognition device for providing the input data by recognizing the voice of the user, and a TSP (Touch Screen Panel) coupled to the display device 210 to provide the input data by recognizing a touch of the user's finger or stylus. The display device 210 displays various image information provided from the MPU 200 on a screen.

A codec (coder-decoder) 212 connected to the MPU 200, and a microphone 214 and a speaker 216 both connected to the codec 212 are audio input/output blocks that are used in telephone communication and audio recording. An RF module 218 functions to transmit and receive RF signals to and from the W-PBX 110 through an antenna. The RF module 218 modulates a signal to be transmitted, inputted from the MPU 200 through a baseband processor 220, and transmits a corresponding RF signal through the antenna. On the other hand, the RF module 218 demodulates an RF signal received through the antenna, and provides it to the MPU 200 through the baseband processor 220. The baseband processor 220 processes baseband signals transmitted and received between the RF module 218 and the MPU 200.

Figure 3:
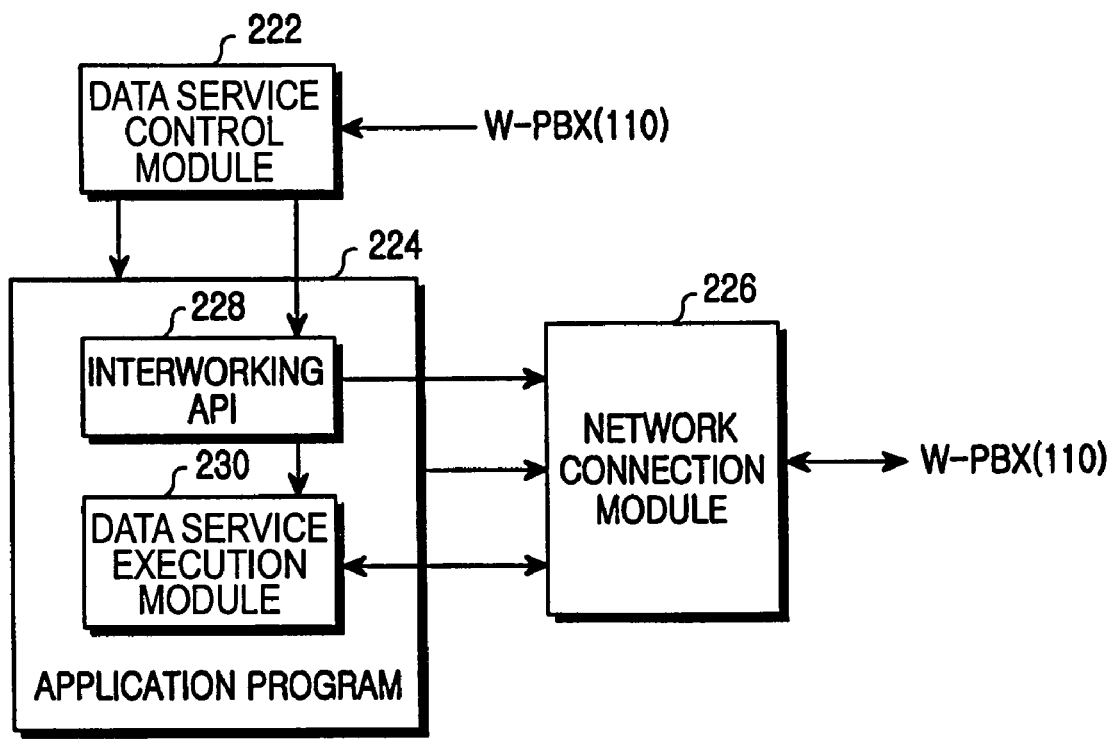
FIG. 3 is a software block diagram of the mobile communication terminal for providing a data service according to the embodiment of the present invention.

FIG. 3 is a block diagram illustrating an application or software to be executed by the MPU 200 of a mobile communication terminal for providing a data service. The software includes a data service control module 222, a data service application program (hereinafter also referred to as an "application program") 224, and a network connection module 226.

The application program 224 includes a data service execution module 230 for executing a predetermined data service, and also includes an interworking API (Application Program Interface) 228 for interworking with the data service control module 222. The application program 224 is executed by the mobile communication terminal user or by the data service control module 222. The interworking API 228 interworks with the data service control module 222 to operate the network connection module 226 and the data service execution module 230.

The data service execution module 230 makes a connection to the data service server 118 through the network connection module 226, and executes a predetermined data service. Here, the interworking API 228 may not be included in the application program 224, differently from the illustration of FIG. 3. Of course, also in this case, the interworking API 228 should be connected to each of the data service control module 222, the network connection module 226, and the data service execution module 230 of the application program 224, since it must interwork with the data service control module 222 to operate the network connection module 226 and the data service execution module 230.

When a mobile communication terminal has entered the precinct wireless network 100, the data service control module 222 automatically performs the application program 224 in response to the notification from the W-PBX 110 of the terminal's entrance into the precinct wireless network 100. When, as described above, the terminal no longer receives the precinct network recognition signal as it exits the network 100, the data service control module 222 automatically terminates the application program 224.

In addition, in the case where the data service control module 222 does not open (does not request) a data channel connection to the W-PBX 110 while the application program 224 is in operation (due to the automatic execution of the program upon entering the precinct wireless network), if the data service control module 222 receives, from the W-PBX 110, a request to perform a data service (hereinafter also referred to as a "data service execution request") that is made by another mobile communication terminal that has entered the precinct wireless network 100 and thus has its data service function executed, the data service control module 222 operates the network connection module 226 and the data service execution module 230 through the interworking API 228. The network connection module 226 is activated by the interworking API 228 or by the application program 224 to make a data channel connection to the W-PBX 110. For example, among mobile communication terminals, one mobile communication terminal's data service execution request to another mobile communication terminal is made in the case where the data service is a service, such as a messenger service, providing data communication between mobile communication terminals, as described below.

The application program 224 described above is provided to perform a single predetermined data service function. In the case where a mobile communication terminal has a plurality of data service functions, a corresponding application program 224 is provided to each of the data service functions. In addition, in the case where it is effective that a plurality of data services be provided while being integrated according to the kind or characteristics of the data services, a corresponding integrated application program may be provided.

In the case where a mobile communication terminal is provided with a plurality of application programs as the terminal is provided with a plurality of data service functions, the data service control module 22 automatically executes only an application program corresponding to a data service function for which the terminal's subscriber has set the automatic execution, in response to the notification of the terminal's entrance into the precinct wireless network.

Figure 4:
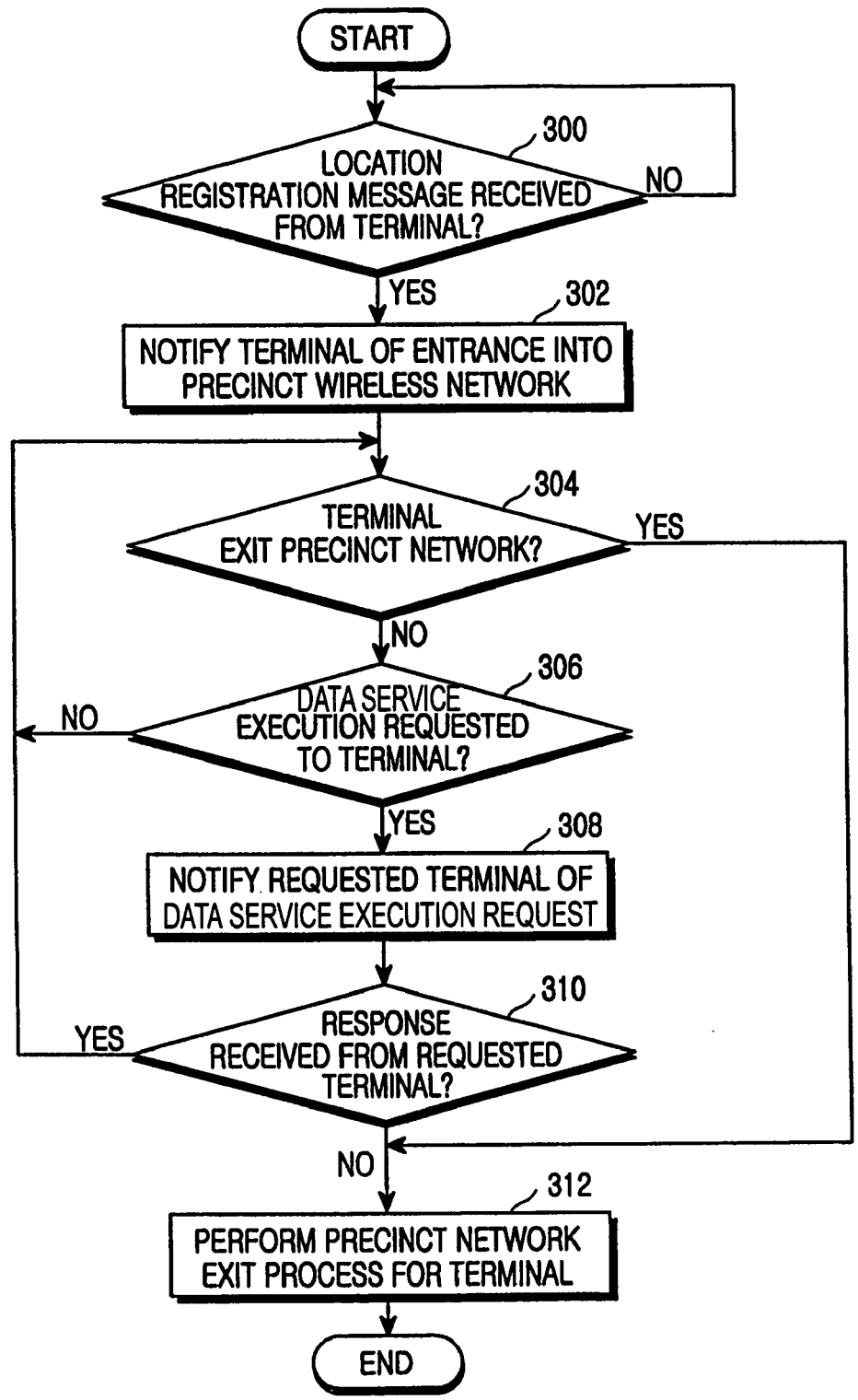
FIG. 4 is a flowchart illustrating the procedure performed by a W-PBX (Wireless-Private Branch Exchange) to provide data services, according to the embodiment of the present invention.
Figure 5:
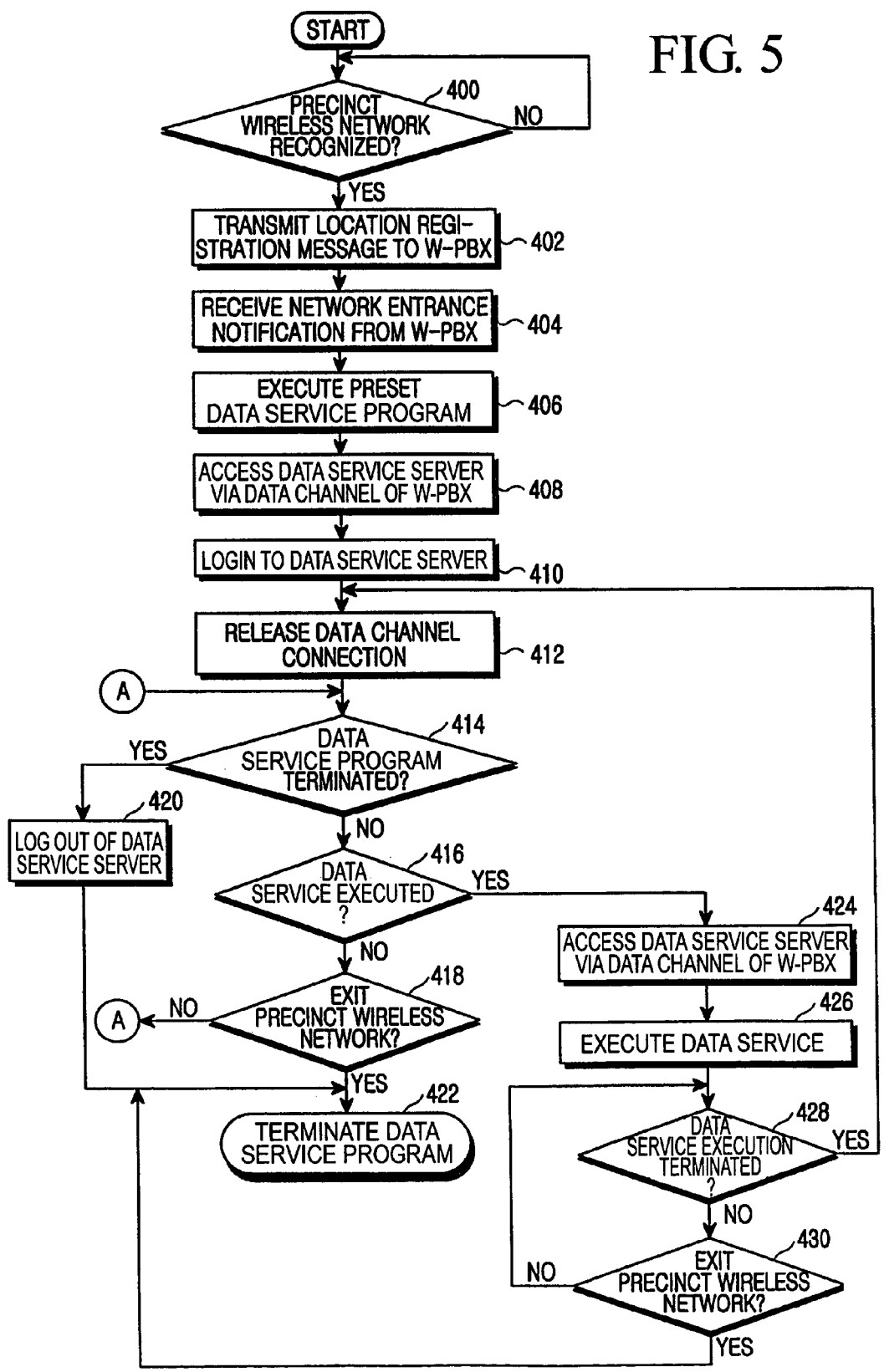
FIG. 5 is a flowchart illustrating the procedure performed by a mobile communication terminal to provide data services according to the embodiment of the present invention.

A description will now be given of the procedure for providing a data service according to the embodiment of the present invention, with simultaneous reference to both FIGS. 4 and 5. FIG. 4 is a flowchart illustrating the procedure of steps 300 to 312 performed by a W-PBX 110 to provide data services to a mobile communication terminal. FIG. 5 is a flowchart illustrating the procedure of steps 400 to 430 performed by a mobile communication terminal to provide data services to a user.

If a mobile communication terminal as shown in FIGS. 2 and 3 enters a precinct wireless network 100 from the outside as the mobile communication terminals 112 and 114 of FIG. 1, it receives a precinct network recognition signal broadcasted from the W-PBX 110 and thus recognizes the precinct wireless network 100 ("Yes" at step 400 of FIG. 5). Upon the recognition of the mobile communication terminal's entrance into the precinct wireless network 100, an MPU 200 of the mobile communication terminal as shown in FIG. 2 advances from step 400 to 402 of FIG. 5 to transmit a location registration message to the W-PBX 110. When the W-PBX 110 receives the location registration message from the mobile communication terminal ("Yes" at step 300 of FIG. 4), the W-PBX 110 notifies the mobile communication terminal of its entrance into the precinct wireless network at step 302 if it is a mobile communication terminal registered in the precinct wireless network 100.

When the MPU 200 of the mobile communication terminal receives the precinct wireless network entrance notification from the W-PBX 110 at step 404, a data service control module 222 executes, at step 406, an application program 224 corresponding to a data service function which has been set to be automatically executed. The application program 224 operates a network connection module 225 at step 408 to make a connection to a data service server 118 through a data channel of the W-PBX 110, and logs in to the data service server 118 at step 410.

While continuing to execute the application program 224 and the login to the data service server 118, the program 224 releases the data channel connection at step 412, and then checks at step 414 whether the program 224 is terminated, at step 416 whether there is a data service execution request, and at step 418 whether the mobile communication terminal has exited the precinct wireless network 100.

The reason for releasing the data channel connection after logging in to the data service server 118 is to prevent the maintenance of an unnecessary connection while a data service is not actually executed. In other words, as the mobile communication terminal enters the precinct wireless network 100, the application program 224 is automatically executed, but the user is not immediately aware of it unless the user is actively viewing the display device 210. Therefore, according to the present invention, the data channel connection is released after logging in to the data service server 118, while continuing to execute the application program 224.

In the meantime, after notifying the mobile communication terminal of the entrance into the precinct wireless network at step 302, the W-PBX 110 checks at step 304 whether the mobile communication terminal has exited the precinct wireless network 100, and checks at step 306 whether there is a data service execution request to the mobile communication terminal. Here, by performing a paging operation at regular intervals to check whether the mobile communication terminal responds, the W-PBX 110 can check whether the communication mobile terminal has exited the precinct wireless network 100. If there is no response from the mobile communication terminal, it is determined that the mobile communication terminal has exited the network 100. Alternatively, it may be determined that the mobile communication terminal has exited the precinct wireless network 100 if a link parameter such as an RSSI (Received Signal Strength Indicator) from the mobile communication terminal is reduced below a predetermined reference level.

A data service execution request to one mobile communication terminal may be made as another mobile communication terminal, which has entered the precinct wireless network 110 and thus has a data service application program executed, requests the data service server 118 to perform the data service for the one mobile communication terminal. Among mobile communication terminals, a mobile communication terminal's data service execution request to a second mobile communication terminal is made in the case where the data service is a service, such as a messenger service, providing data communication between mobile communication terminals.

In the case where one mobile communication terminal appoints another mobile communication terminal as its counterpart mobile communication terminal, and makes a data service execution request to the counterpart mobile communication terminal, if the data channel connection for the counterpart mobile communication terminal has been released as described above after it has logged in to the data service server 118, the server 118 requests the W-PBX interworking server 116 to perform the data service for the counterpart mobile communication terminal. In response to this request, the W-PBX interworking server 116 requests the W-PBX 110 to notify the counterpart mobile communication terminal that the data service execution request is made.

In response to the notification request, the W-PBX 110 moves from said step 306 to step 308 to notify a mobile communication terminal, to which the data service execution request is made from the W-PBX interworking server 116, (i.e., the counterpart mobile communication terminal) of the data service execution request.

The notification of the data service execution request may be made through, for example, an SMS (Short Message Service) provided by the W-PBX 110. In the case of using the SMS, the data service server 118 requests via the W-PBX interworking server 116 that the W-PBX 110 send an SMS message containing a predetermined code representing the data service execution request, while appointing the counterpart mobile communication terminal as the recipient. Such an SMS message is transmitted by the W-PBX 110 to the counterpart mobile communication terminal, and, upon the receipt of the SMS message, the counterpart mobile communication terminal checks whether the received SMS message contains the code representing the data service execution request. If the received SMS message does not contain the code representing the data service execution request, the mobile communication terminal performs a general process according to the SMS message reception.

On the contrary, if the received SMS message contains the code representing the data service execution request, the counterpart mobile communication terminal (hereinafter also referred to as a "data service requested terminal") allows the data service control module 222 to operate the network connection module 226 through the interworking API 228, so as to make a connection to the data service server 118 through a data channel of the W-PBX 110, and then operates the data service execution module 230 to perform the data service.

After having notified, at step 308, the data service requested terminal, to which the data service execution request is made from the W-PBX interworking server 116, of the data service execution request, the W-PBX 110 checks at step 310 whether there is a response to the notification of the data service execution request from the data service requested terminal. If such a response is received, the procedure moves again to said step 304, whereas if no response is received, the procedure moves to step 312 to perform a precinct wireless network exit process for the data service requested terminal.

If the checked result at step 304 is that the data service requested terminal has exited the precinct wireless network 100, the W-PBX moves from step 304 to 312 to perform the precinct wireless network exit process for the terminal.

At step 312, the W-PBX 110 not only performs a location registration cancellation process, for the data service requested terminal, but also notifies the data service server 118 of the data service-requested terminal's exit from the precinct wireless network through the W-PBX interworking server 116. Accordingly, even when a mobile communication terminal exits the precinct wireless network 100 without logging out of the data service server 118 intentionally or unintentionally, the data service server 118 can automatically perform a logout process for the mobile communication terminal.

In the meantime, the MPU 200 of one mobile communication terminal (or data service-requested terminal) moves from step 416 to 424, if the checked result at step 416 is that the terminal's user has requested a data service execution through the input device 208, or that the terminal has been notified from the W-PBX 110 of a data service execution request made by another mobile communication terminal. In the case where the user has requested the data service execution through the input device 208, the application program 224 operates the network connection module 226 at step 424 to make a connection to the data service server 118 through a data channel of the W-PBX 110.

In the case where the terminal has been notified from the W-PBX 110 of a data service execution request made by another mobile communication terminal, the data service control module 222 operates at step 424 the network connection module 226 through the interworking API 228 to make a connection to the data service server 118 through a data channel of the W-PBX 110.

If the terminal reconnects to the data service server 118 at step 424, the data service execution module 230 interworks with the data service server 118 at step 426 to perform the data service. Thereafter, it is checked at steps 428 whether the data service execution has been terminated, and at steps 430 whether the terminal has exited the precinct wireless network 100. If the checked result at step 428 is that the data service execution has been terminated, the procedure moves from step 428 to the above step 412.

If the checked result at step 428 is that the data service execution has not been terminated, the procedure moves to step 430 to determine whether the terminal has exited the precinct wireless network 100, and if so the procedure moves from step 430 to step 422 to terminate the application program 224, and if not the procedure moves from step 430 to 428.

If the user chooses, through the input device 208, to terminate the application program 224 at said steps 414, the procedure moves from step 414 to step 420. At step 420, the application program 224 operates the network connection module 226 to reconnect to the data service server 118, so as to log out of the data service server 118 and release the data channel connection, and the procedure then moves to step 422 to terminate the application program 224.

If it is determined at step 416 that the data service was not executed, the precess moves to step 418 to check if the mobile communication terminal (data service-requested terminal) has exited the precinct wireless network. If the checked result at step 418 is that the terminal has exited the precinct wireless network 100, the procedure moves from step 418 to step 422 to terminate the application program 224. If the checked result at step 418 is that the terminal has not exited the precinct wireless network 100, the procedure moves from step 418 to step 414.

In the meantime, if the data service is a service that has no need to log in to the data service server 118, such as a real time news service, there is no need to perform said steps 410 and 420, so they are omitted in the procedure. That is, in this case, the procedure moves from step 408 to step 412 without passing through said step 410, and if the terminal's user selects at step 414 the termination of the application program 224 through the input device 208, the procedure moves from step 414 to step 422 without passing through said step 420.

In addition, in the case there is a data service execution request to a mobile communication terminal, the terminal's user can select whether to approve the data service execution. In other words, the user can ignore a data service execution request made by an undesired counterpart terminal, and can enable only a data service execution requested by an approved counterpart terminal. For example, a user can preset solicited identification numbers of mobile communication terminals, whose data service execution request to the user's terminal will be approved, and unsolicited identification numbers of mobile communication terminals, whose data service execution request to the user's terminal will be disapproved, in the data service server 118.

Thereafter, in the case where a mobile communication terminal (i.e., a data service-requesting party) makes a data service execution request to another mobile communication terminal (i.e., a data service requested party), if the requested party has not set the requesting party to be approved, or has set the requesting party to be disapproved, the data service server 118 does not request the data service execution for the requested party from the W-PBX interworking server 116. In addition, alternatively, the data service server 18 may inform the requesting party that the data service execution for the requested party has not been set to be approved or has been set to be disapproved.

According to the present invention, even when the user of a mobile communication terminal separately executes a data service application program that is employed in the terminal to provide a data service, the application program is automatically executed when the terminal enters a precinct wireless network, and it is automatically terminated when the terminal exits the network. This makes it convenient for the user to use the data service. In addition, even while a data service function is running, the terminal opens a data channel connection to the precinct wireless network only when a real data service is currently executed, otherwise it releases the data channel connection to the precinct wireless network. This prevents an unnecessary load on mobile communication network resources.

Further, a specific data service according to the characteristics of the zone of a precinct wireless network can be provided free or at a fixed rate to a mobile communication terminal subscriber registered in the precinct wireless network, and it is possible to secure new customers or improve income effectively.

A description will now be given of first to fourth application examples of the present invention for providing data services, which correspond respectively to a messenger service in a campus, a stock transaction service on the stock exchange floor of a stock brokerage firm, a room service in a hotel, and a news service in a specific zone.

The messenger service according to the first application example is a data service whereby in a precinct wireless network having a campus in its service region, mobile communication terminal subscribers in the campus can use messenger services between each other using their individual terminals. The stock transaction service according to the second application example is a data service whereby in a precinct wireless network having a building of a stock brokerage firm in its service region, mobile communication terminal subscribers on the stock exchange floor can use stock services such as stock transaction and inquiry services using their individual terminals. The room service according to the third application example is a data service whereby in a precinct wireless network having a hotel in its service region, mobile communication terminal subscribers in the hotel can request and use various room services using their individual terminals. The news service according to the fourth application example is a data service whereby in a precinct wireless network whose service region includes specific zones such as newspaper company, broadcasting company, corporate and public buildings, real time news is provided to mobile communication terminal subscribers in the specific zones.

In the following description, FIGS. 6, 9, 13 and 16 show individual network architectures for providing data services according to the first to fourth application examples, respectively. However, it should be noted that the following descriptions have been made simply for the sake of an easier explanation while it does not mean that the application examples are provided individually, but the application examples maybe provided independently or in any types of combinations thereof.

Figure 6:
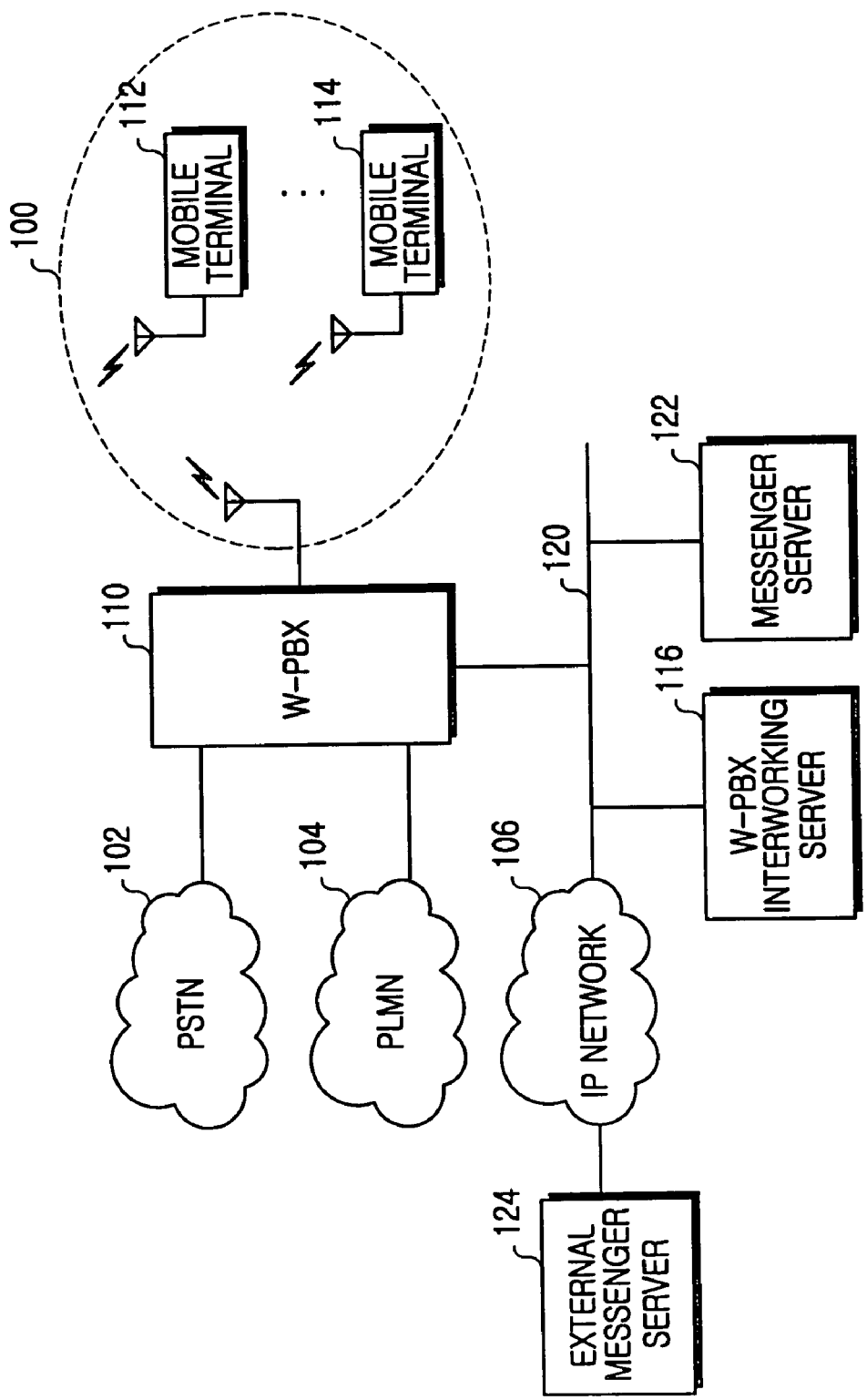
FIG. 6 shows the configuration of a network for providing a data service according to a first application example of the present invention.

FIG. 6 shows the configuration of a network for providing a data service according to the first application example. This figure illustrates the case in which a messenger service, as a data service, is provided to a mobile communication terminal in a precinct wireless network 100 which has a precinct wireless network region in a campus. As shown in this figure, a messenger server 122, corresponding to the above data service server 118 of FIG. 1, is connected to a LAN 120 in order to provide the messenger service. The messenger server 122 may interwork with an external messenger server 124, corresponding to the above external server 108 of FIG. 1, through an IP network 106. As examples of external messenger services provided by the external messenger server 124, there are various messenger services such as MSN (Microsoft Network) messenger, ICQ (I Seek You) messenger, and yahoo messenger.

Figure 7:
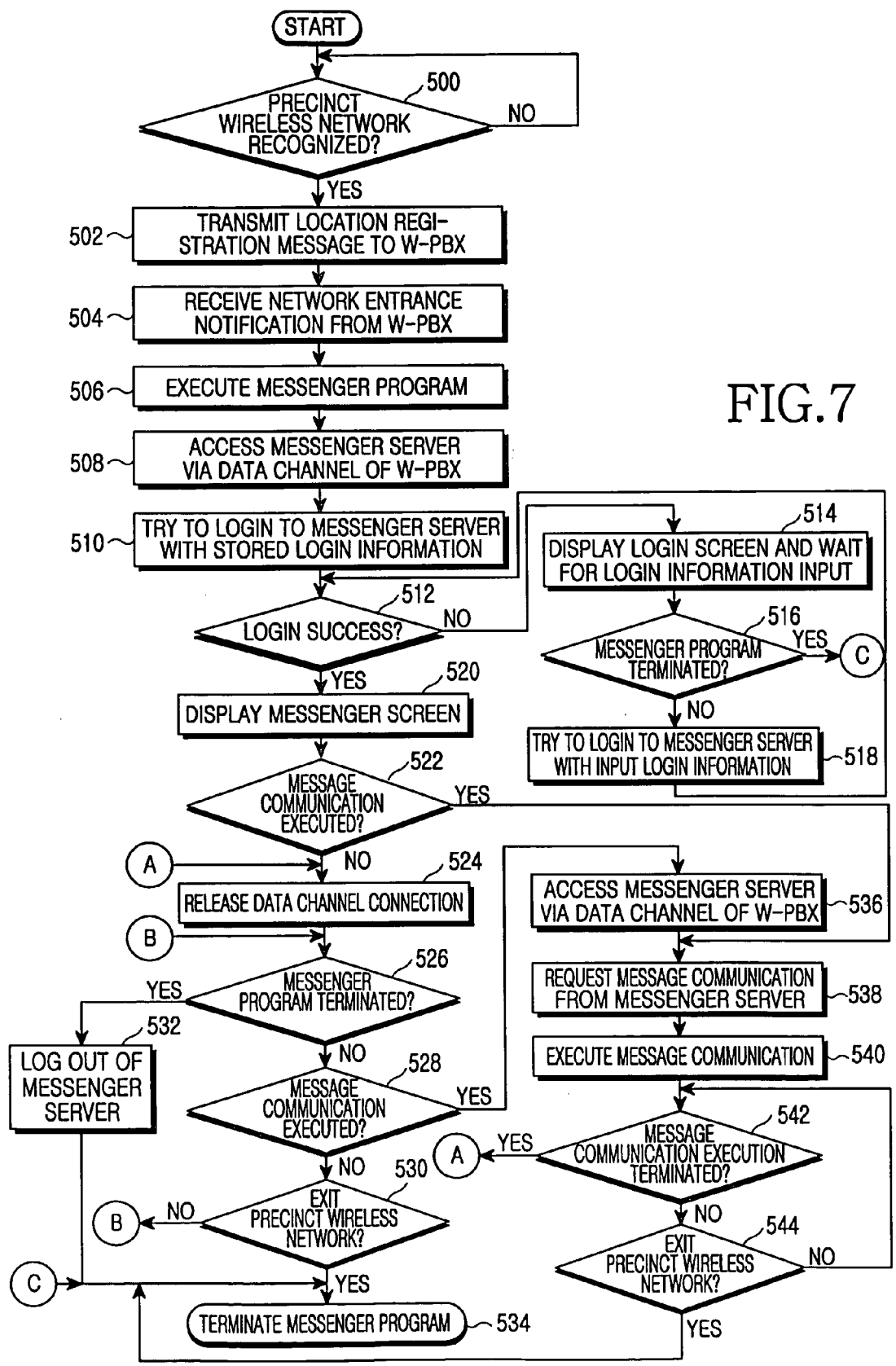
FIG. 7 is a flowchart illustrating the procedure performed by a mobile communication terminal to provide data services according to the first application example of the present invention.

In the first application example, the mobile communication terminal is provided with a messenger program, corresponding to the above application program 224 of FIG. 3, in order to execute a messenger service. For providing the messenger service as a data service, the W-PBX 110 performs the same procedure as shown in FIG. 4, and the mobile communication terminal performs the procedure of steps 500 to 544 as shown in FIG. 7.

When a mobile communication terminal configured as shown in FIGS. 2 and 3 enters the precinct wireless network 100 from the outside thereof as the terminals 112 and 114 of FIG. 6, it receives a precinct network recognition signal broadcasted from the W-PBX 110 to recognize the precinct wireless network 100. After having recognized the terminal's entrance into the network 100 at step 500 as shown in FIG. 7, an MPU 200 as shown in FIG. 2 in the terminal moves from step 500 to 502 to transmit a location registration message to the W-PBX 110. Accordingly, the terminal receives a precinct wireless network entrance notification from the W-PBX 110 at step 504, and the data service control module 222 then performs a messenger program, as the application program 224, at step 506.

The messenger program operates the network connection module 226 at step 508 to make a connection to the messenger server 122 through a data channel of the W-PBX 110, and then tries to log in to the messenger server 122 at step 510. Either steps 514 to 518 or step 520 are performed depending on whether or not the login is successful at step 512. The login trial is made with login information, i.e., an ID and a password that the user has previously stored in the terminal. Of course, in the case where there is no login information previously stored, there is a need to display a login screen through the display device 210 so as to permit the user to input the login information. However, it is assumed in this description that login information inputted by the user during a previous login has been stored in the terminal.

If the login failed at step 512, a login screen is displayed through the display device 210 at step 514 while it is checked at steps 516 whether the messenger program has been terminated, and when the user inputs login information, a login trial to the messenger server 122 is made again with the inputted login information at step 518, which is followed by said step 512. If the terminal's subscriber selects the termination of the messenger program using the input device 208 at step 516, the procedure moves from step 516 to step 534 to terminate the messenger program.

If the login succeeds at step 512, the messenger program displays at step 520 a messenger screen through the display device 210 to show a buddy list which permits the user to check the states of users who have been approved to communicate with the terminal's user via the messenger service. Thereafter, it is checked at step 522 whether the messenger service (i.e., messenger transmission and reception) is executed, and, depending on this checked result, the procedure moves to either step 524 or step 538. The messenger transmission/reception execution may be requested by the terminal user's selection of another user in the buddy list whom the terminal user wishes to communicate with. Alternatively, as described above, the messenger transmission/reception execution may be requested by the user of another terminal that has entered the precinct wireless network 100 and thus has its messenger program executed.

If the messenger transmission/reception execution has been requested at step 522, the procedure moves to step 538. On the contrary, if there is no request to execute the messenger transmission/reception, the data channel connection is released at step 524. Subsequently, it is checked at step 526 whether the messenger program has been terminated, at step 528 whether there is a request to execute the messenger transmission/reception, and at step 530 whether the terminal has exited the precinct wireless network 100.

If the checked result of step 528 is that the terminal's user has requested a messenger transmission/reception execution through the input device 208, or that it is notified from the W-PBX 110 of a messenger transmission/reception execution request made by another mobile communication terminal, the procedure moves from step 528 to 536. In the case where the terminal's user has requested a messenger transmission/reception execution through the input device 208, the messenger program operates the network connection module 226 at step 536 to make a connection to the messenger server 122 through a data channel of the W-PBX 110. On the contrary, in the case where the terminal is notified from the W-PBX 110 of a messenger transmission/reception execution request made by another mobile communication terminal, the data service control module 222 operates the network connection module 226 through the interworking API 228, at step 536, to make a connection to the messenger server 122 through a data channel of the W-PBX 110.

After making a reconnection to the messenger server 122 at step 536, the terminal's user requests at step 538 that the messenger server 122 enable him or her to perform message transmission/reception with another user (also referred to as a "counterpart user") he or she has selected from the buddy list, or with another user who has requested the message transmission/reception execution. In the case where a mobile communication terminal (referred to as a "counterpart terminal") of the counterpart user selected by the user has entered the precinct wireless network 100 and has its messenger program executed, but does not execute the messenger program, the messenger server 122 requests a message transmission/reception execution for the counterpart terminal from the W-PBX interworking server 116, as described previously. Accordingly, the W-PBX 110 notifies the counterpart terminal of the message transmission/reception execution request, and in response to this notification, a data service control module 222 of the counterpart terminal activates the network connection module 226 through the interworking API 228 to make a connection to the messenger server 122, whereby the counterpart terminal enters a message transmission/reception execution mode.

Thereafter, at step 540, the data service execution module 230 of the messenger program interworks with the messenger server 122 to perform the message transmission/reception. It is then checked at step 542 whether the message transmission/reception execution has been terminated, and at step 544 whether the terminal has exited the precinct wireless network 100.

If the checked result at step 542 is that the message transmission/reception execution has been terminated, the procedure moves from step 542 to step 524, and if the checked result at step 544 is that the terminal has exited the precinct wireless network 100, the procedure moves from step 544 to step 534 to terminate the messenger program.

In the procedure of steps 526 to 530, if the checked result at step 530 is that the terminal has exited the precinct wireless network 100, the procedure moves to step 534 to terminate the messenger program. In this manner, also when the terminal has exited the precinct wireless network 100 without logging out of the messenger service server 122 unintentionally, the W-PBX 110 informs the server 122 through the W-PBX interworking server 116 that the terminal has exited the precinct wireless network 100, so that the messenger server 122 performs the logout process, as described above at step 312 in FIG. 4.

If the checked result at step 526 is that the terminal's user has selected the termination of the messenger program through the input device 208, the procedure moves to step 532. At this step, the messenger program operates the network connection module 226 to reconnect to the messenger server 122, and logs out of the server 122 and releases the data channel connection, and then the procedure moves to step 534 to terminate the messenger program.

As described above, according to the first application example, when a mobile communication terminal subscriber enters a campus, a messenger function is automatically executed, and thereafter, when the terminal exits the campus the messenger function is automatically terminated. This makes it convenient for the subscriber to use the messenger service using his or her terminal.

Figure 8:
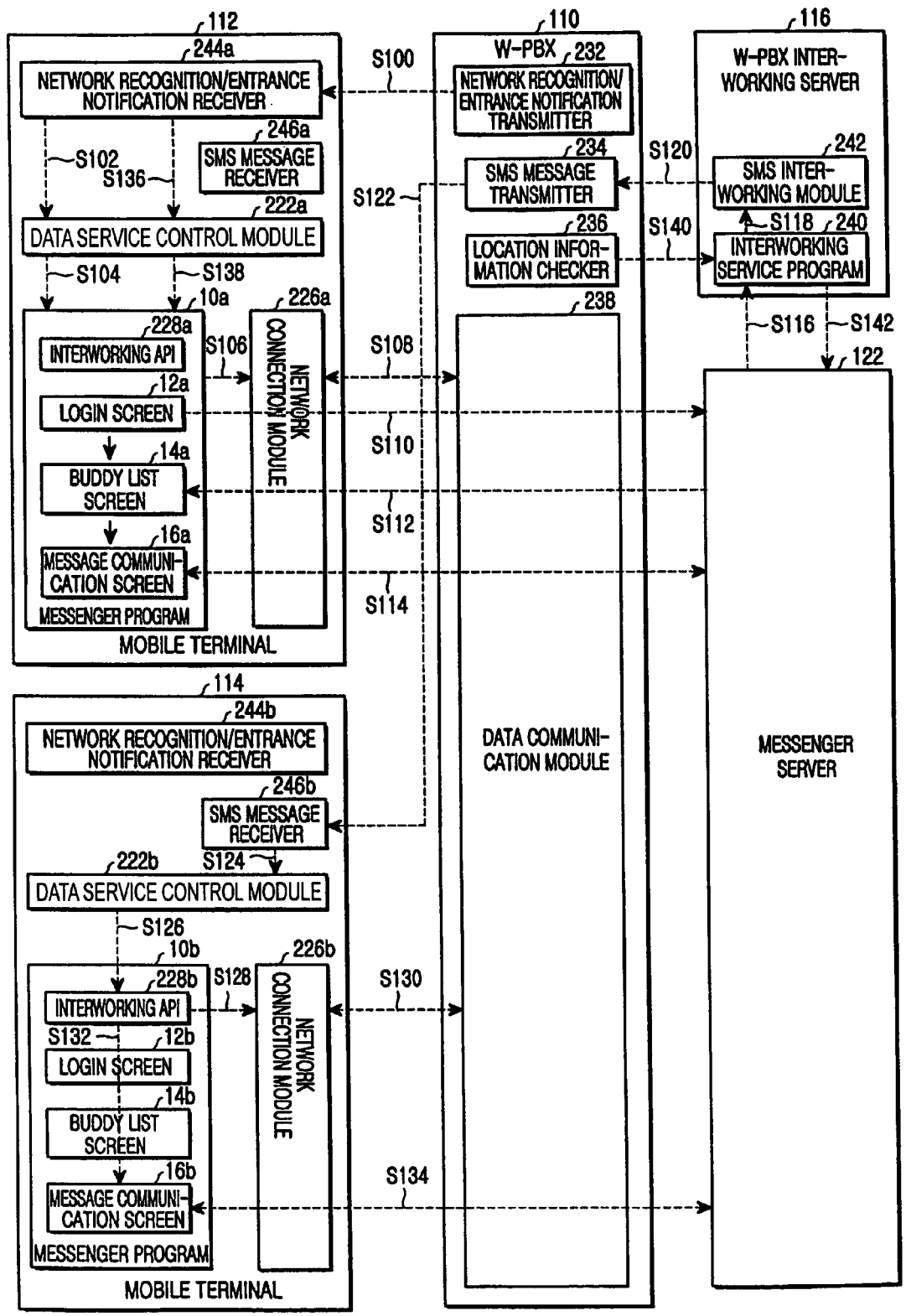
FIG. 8 illustrates a data service scenario according to the first application example.

An example scenario of the messenger service is illustrated in FIG. 8 for the sake of a better understanding of the messenger service according to the first application example as described above. As shown in this figure, the W-PBX 110 includes a function 232 for transmitting a precinct network recognition/entrance notification signal, which broadcasts a precinct network recognition signal to a mobile communication terminal and notifies the terminal of its entrance into the precinct wireless network, and a function 234 for transmitting an SMS message to a mobile communication terminal. The W-PBX 110 further includes a location information checking function 236 for checking the location of a mobile communication terminal, and a data communication module 238 for implementing the data communication of a mobile communication terminal.

Mobile communication terminals 112 and 114 include functions 244a and 244b for receiving precinct network recognition signals broadcasted from the W-PBX 110 and also receiving precinct network recognition/entrance notification signals from the W-PBX 110, and functions 246a and 246b for receiving SMS messages from the W-PBX 110, respectively.

The W-PBX interworking server 116 includes an interworking service program 240 for allowing the interworking between the messenger server 122 and the W-PBX 110, and an SMS interworking module 242 for requesting the W-PBX 110 to transmit an SMS message in response to the request from the messenger server 122.

For the purpose of differentiating the elements of the terminals 112 and 114 from each other in FIG. 8, a letter 'a' is included in each of reference numerals indicating the elements of the terminal 112, whereas a letter 'b' is included in each of reference numerals indicating the elements of the terminal 114. In this figure, data service control modules 222a and 222b, messenger programs 10a and 10b, interworking APIs 228a and 228b and network connection modules 226a and 226b of the terminals 112 and 114 correspond respectively to the data service control module 222, the application program 224, the interworking API 228, and the network connection module 226 in FIG. 3. Login screens 12a and 12b, buddy list screens 14a and 14b, and message transmission/reception screens 16a and 16b are provided by operating the data service execution module 230 of the messenger programs 10a and 10b.

The example scenario of the messenger service will now be described centering on the terminal 112, of the two terminals 112 an 114 as shown in FIG. 8, on the assumption that the terminal 114 firstly enters the precinct wireless network 100 and has its messenger program 10b executed, and after it logs in to the messenger server 122, the data channel connection has been released.

In this case, when the user of the terminal 112 enters the precinct wireless network 100 while carrying the terminal 112, the terminal 112 receives at step S100 a precinct network recognition/entrance notification signal, transmitted by the notification signal transmitting function 232 of the W-PBX 100, through the notification signal receiving function 244a. When, in response to this reception, the notification signal receiving function 244a informs the data service control module 222a of the received precinct network recognition signal at step 102, the data service control module 222a executes the messenger program 10a at step S104. The messenger program 10a then activates the network connection module 226a at step 106, so as to make a connection to the data communication module 238 of the W-PBX 110 and secure a data channel at step S108, thereby enabling the data communication. At step S110, the messenger program 10a tries to log in to the messenger server 122 with a corresponding login ID and password stored in the terminal 112. In the case where the login failed as a result of the check at the server 122 of the login ID and password, the messenger program 10a displays the login screen 12a, and receives login information inputted from the user to retry the login of step S110.

When the login succeeds, the messenger program 10a moves to step S112 to provide the messenger screen. That is, at step S112, the messenger program 10a receives a buddy state, i.e., a buddy list for checking the states of other users, who have been approved to use the messenger service with the user of the terminal 112, so as to display a buddy list screen 14a. If the user of the terminal 112 selects another user (also referred to as a "counterpart user") in the buddy list with whom he or she wishes to perform message transmission/reception, the messenger program 10a requests at step S114 the messenger server 122 to request the counterpart user to execute or activate the message transmission/reception screen, and then activates the screen 16a for transmitting and receiving messages to and from the messenger server 122.

In the case where the counterpart user, to which the message transmission/reception screen activation is requested, is a user of the terminal 114 that has released the data channel connection with the precinct wireless network 100 after logging in to the messenger server 122 as described above, the messenger server 122 executes the interworking service program 240 of the W-PBX interworking server 116 at step S116 to request at step S118 that the SMS interworking module 242 transmit an SMS message for requesting the terminal 114 to execute the message transmission/reception. In response to this request, the SMS interworking module 242 transfers the SMS message transmission request to the SMS message transmission function 234 at step S120.

Accordingly, the SMS message transmission function 234 of the W-PBX 110 transmits the SMS message for the message transmission/reception execution request at step S122, and the SMS message receiving function 246b of the terminal 114 receives the transmitted SMS message.

When the SMS message receiving function 126b of the terminal 114 informs at step S124 the data service control module 124b that the message transmission/reception execution request is received, the data service control module 124b transfers it, at step S126, to the interworking API 228b of the messenger program 10b. The API 228b activates at step S128 the network connection module 226b according to a preset communication environment, so that the module 226b makes a connection to the data communication module 238 of the W-PBX 110 to secure a data channel at step S130. As the data channel is secured, the interworking API 228b activates the message transmission/reception screen 16b of the messenger program 10b at step S132. Accordingly, the users of the terminals 112 and 114 transmit and receive messages with each other through the messenger server 122 at step S134.

In the meantime, in the case where it has exited the precinct wireless network 100, the mobile communication terminal 112 does not receive the precinct network recognition signal any longer. Then, the network recognition/entrance notification receiving function 244a informs at step S136 the data service control module 222a that it is no longer receiving the precinct network recognition signal, so that the data service control module 222a terminates the messenger program 10a at step S138. In addition, the W-PBX interworking server 116 checks at step S140 through a location information checking function 236 of the W-PBX 110 that the terminal 112 has exited the precinct wireless network 100, and informs, at step S142, the messenger server 122 of it so as to log the user out of the server 122.

Figure 9:
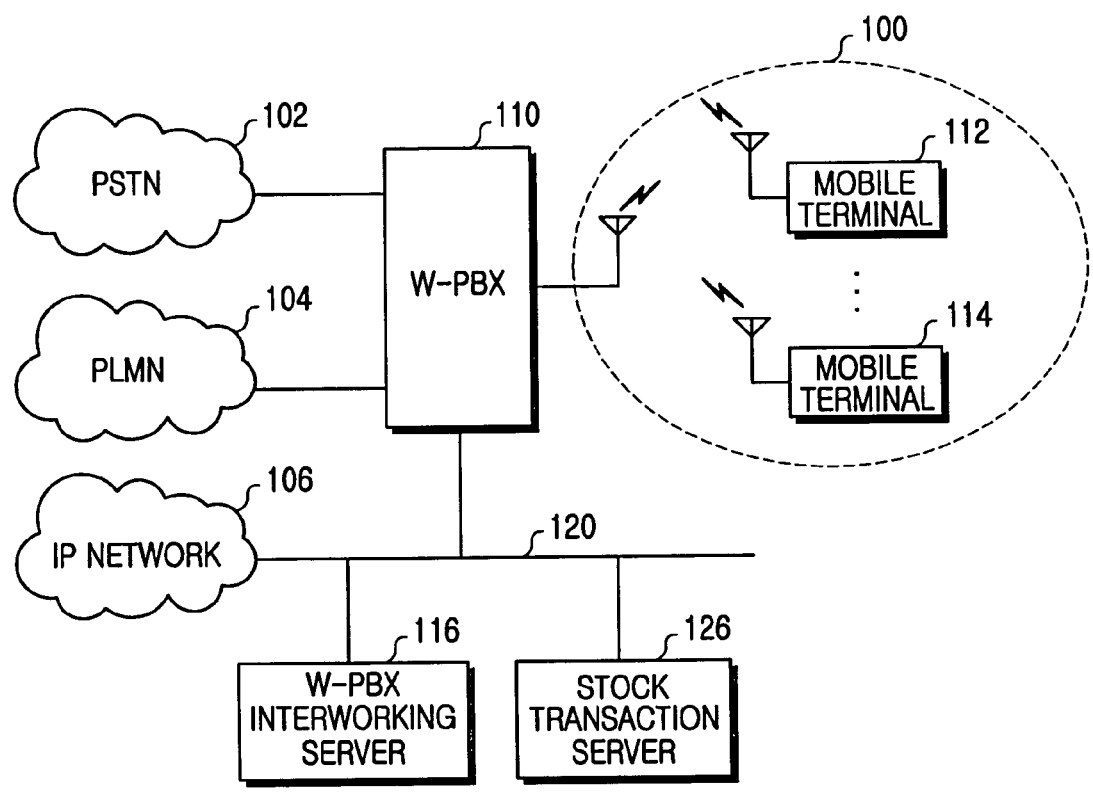
FIG. 9 shows the configuration of a network for providing a data service according to a second application example of the present invention.

FIG. 9 shows the configuration of a network for providing a data service according to the second application example of the present invention. This figure illustrates the case in which a stock transaction service, as a data service, is provided to a mobile communication terminal in a precinct wireless network 100 which has a precinct wireless network region on the stock exchange floor of a stock brokerage firm. As shown in this figure, a stock transaction server 126, corresponding to the above data service server 118 of FIG. 1, has a connection to a LAN 120.

Figure 10:
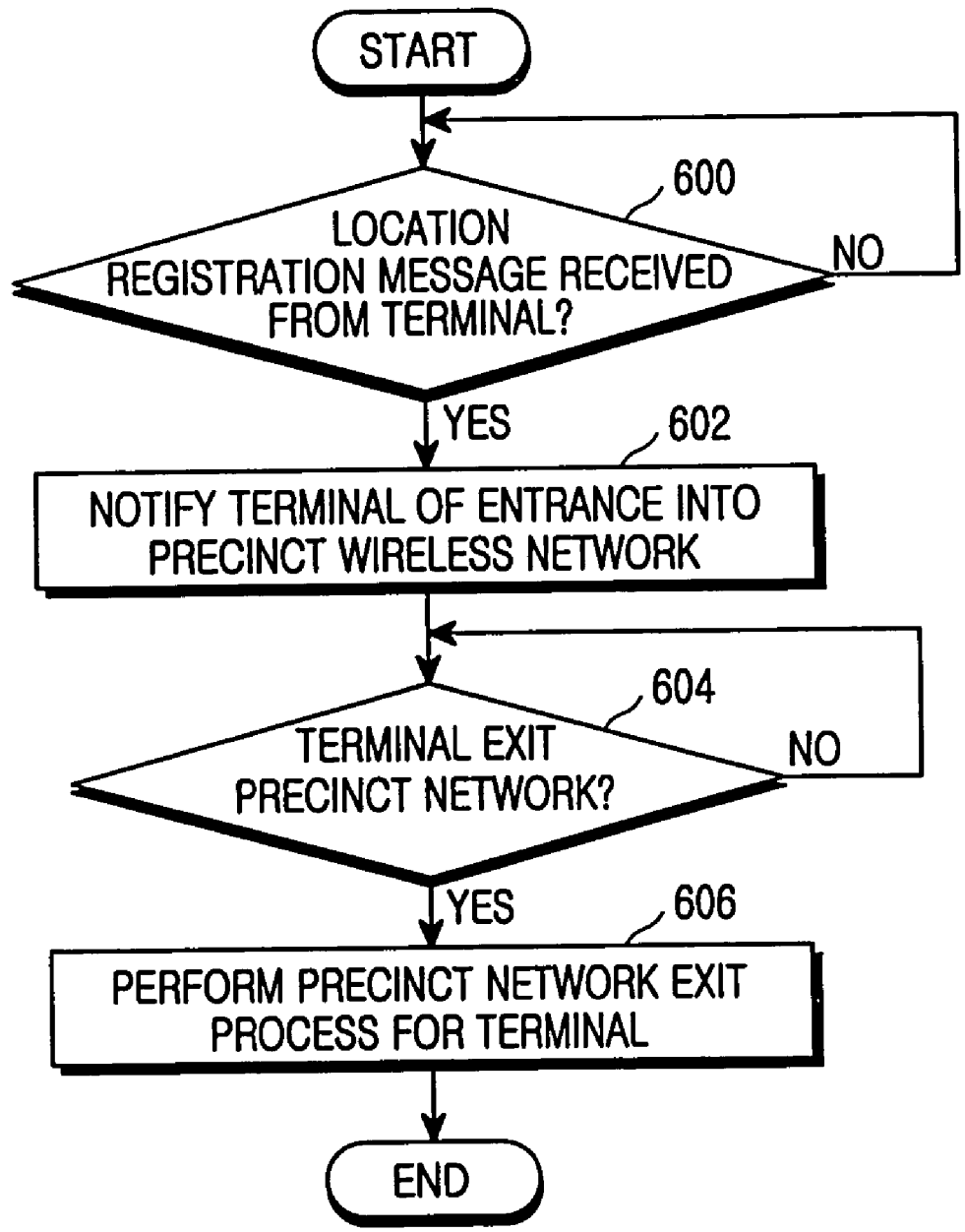
FIG. 10 is a flowchart illustrating the procedure performed by a W-PBX (Wireless-Private Branch Exchange) to provide data services, according to the second application example of the present invention.
Figure 11:
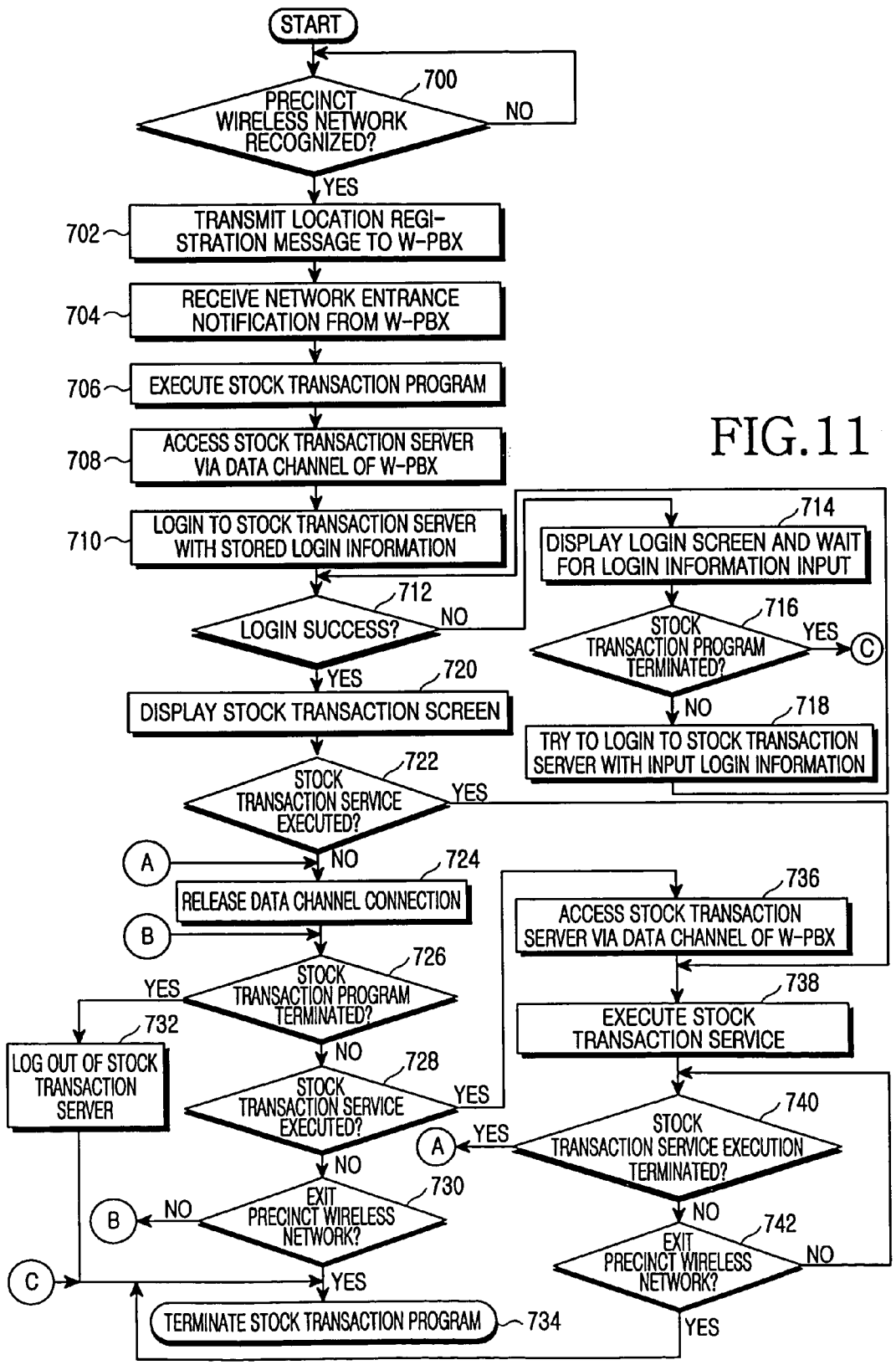
FIG. 11 is a flowchart illustrating the procedure performed by a mobile communication terminal to provide data services according to the second application example of the present invention.

In the second application example, the mobile communication terminal is provided with a stock transaction program, corresponding to the above application program 224 of FIG. 3, in order to execute a stock transaction service. The W-PBX 110 performs the procedure of steps 600 to 606 as shown in FIG. 10, and the mobile communication terminal performs the procedure of steps 700 to 742 as shown in FIG. 11.

When a mobile communication terminal enters the precinct wireless network 100 from the outside thereof as the terminals 112 and 114 of FIG. 9, it receives a precinct network recognition signal broadcasted from the W-PBX 110 to recognize the precinct wireless network 100. After recognizing the terminal's entrance into the network 100 at step 700 as shown in FIG. 11, an MPU 200 as shown in FIG. 2 in the terminal moves from step 700 to step 702 to transmit a location registration message to the W-PBX 110. When it receives the location registration message from the mobile communication terminal at step 600 of FIG. 10, the W-PBX 110 notifies the mobile communication terminal of its entrance into the precinct wireless network at step 602 in the case where it is a terminal registered in the precinct wireless network 100. Thereafter, the W-PBX 110 checks at step 604 whether the terminal has exited the precinct wireless network 100, and if the checked result is that it has exited the network 100, it performs at step 606 a precinct wireless network exit process for the terminal in the same manner as the above step 312 of FIG. 4. Here, the W-PBX 110 informs the stock transaction server 126 through the W-PBX interworking server 116 of the terminal's exit from the precinct wireless network, so that the stock transaction server 126 performs a logout process for the mobile communication terminal.

In the meantime, the mobile communication terminal receives at step 704 the precinct wireless network entrance notification from the W-PBX 110, and the data service control module 222 performs at step 706 a stock transaction program corresponding to the application program 224. The stock transaction program operates at step 708 the network connection module 226 to make a connection to the stock transaction server 126 through a data channel of the W-PBX 110. At step 710, the stock transaction program tries to log in to the stock transaction server 126, and, depending on the result of a check at step 712 as to whether the login succeeds, the procedure moves to either steps 714 to 718 or step 720. The login trial is made with login information (i.e., a login ID and a password) that the user has previously stored in the terminal.

If the checked result at step 712 is that the login failed, a login screen is displayed through the display device 210 at step 714 while it is checked at step 716 whether the stock transaction program has been terminated, and when the user inputs login information, a login trial to the stock transaction server 126 is made again with the inputted login information at step 718, which is followed by said step 712. Here, if the terminal's user selects the termination of the stock transaction program using the input device 208 at step 716, the procedure moves from step 716 to step 734 to terminate the stock transaction program.

If the login succeeds at step 712, the stock transaction program displays at step 720 a stock transaction screen through the display device 210. Thereafter, it is checked at step 722 whether the stock transaction service execution (i.e., stock-related information search or stock transaction desired by the user) is requested, and, depending on this checked result, the procedure moves to either step 724 or step 738. If the stock transaction service execution has been requested at step 722, the procedure moves to step 738. On the contrary, if there is no request to execute the stock transaction service, the data channel connection is released at step 724. Subsequently, it is checked at step 726 whether the stock transaction program has been terminated, at step 728 whether there is a request to execute the stock transaction service, and at step 730 whether the terminal has exited the precinct wireless network 100.

If the checked result of step 728 is that the terminal's user has requested a stock transaction service execution through the input device 208, the procedure moves from step 728 to 736. At step 736, the stock transaction program operates the network connection module 226 to make a connection to the stock transaction server 126 through a data channel of the W-PBX 110. At step 738, the stock transaction program executes the stock transaction service by interworking with the stock transaction server 126 according to a stock information search or a stock transaction of the user. It is then checked at step 740 whether the stock transaction service execution has been terminated, and at step 742 whether the terminal has exited the precinct wireless network 100. If the checked result at step 740 is that the stock transaction service execution has been terminated, the procedure moves from step 740 to the above step 724, and if the checked result at step 742 is that the terminal has exited the precinct wireless network 100, the procedure moves from step 742 to step 734 to terminate the stock transaction program.

If the checked result at step 730 is that the terminal has exited the precinct wireless network 100, the procedure moves to step 734 to terminate the stock transaction program.

Here, in the same manner as the above step 312, the W-PBX 110 informs, at step 606 of FIG. 10, the stock transaction server 126, through the W-PBX interworking server 116, that the terminal has exited the precinct wireless network 100, so that the stock transaction server 126 performs the logout process.

If the checked result at step 726 is that the terminal's user has selected the termination of the stock transaction program through the input device 208, the procedure moves to step 732. At step 732, the stock transaction program activates the network connection module 226 to reconnect to the stock transaction server 126, and logs out of the server 126 and releases the data channel connection, and then the procedure moves to step 734 to terminate the stock transaction program.

As described above, according to the second application example, when a mobile communication terminal subscriber enters the stock exchange floor of a stock brokerage firm, a stock transaction function is automatically executed, and thereafter, when the terminal exits the stock exchange floor, the stock transaction function is automatically terminated. This makes it convenient for the subscriber to use the stock transaction service using his or her terminal.

Figure 12:
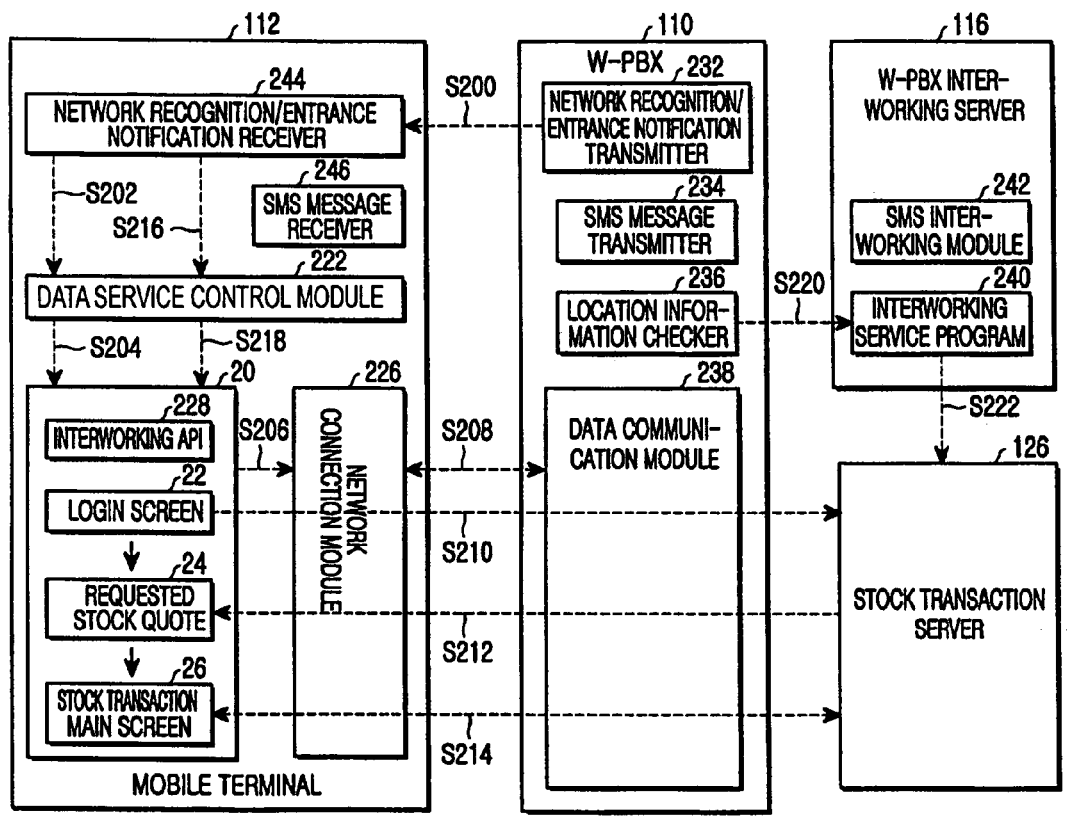
FIG. 12 illustrates a data service scenario according to the second application example.

An example scenario of the stock transaction service is illustrated in FIG. 12 for the sake of a better understanding of the stock transaction service according to the second application example as described above. As in the above case of FIG. 8, the W-PBX 110 in this figure includes a function 232 for transmitting a precinct network recognition/entrance notification signal, a function 234 for transmitting an SMS message, a location information checking function 236, and a data communication module 238, as shown in FIG. 12.

In addition, the mobile communication terminal 112 includes a function 244 for receiving a precinct network recognition/entrance notification signal, and a function 246 for receiving an SMS message, and the W-PBX interworking server 116 includes an interworking service program 240 and an SMS interworking module 242. A stock transaction program 20 of the terminal 112 corresponds to the application program 224 of FIG. 3. A login screen 22, a requested stock quote screen 24, and a stock transaction main screen 26 are provided by operating the data service execution module 230 of the stock transaction program 20.

When the user of such a terminal 112 as shown in FIG. 12 enters the precinct wireless network 100 while carrying the terminal 112, the terminal 112 receives at step S200 a precinct network recognition/entrance notification signal, transmitted by the notification signal transmitting function 232 of the W-PBX 100, through the notification signal receiving function 244. When, in response to this reception, the notification signal receiving function 244 informs the data service control module 222 of the received precinct network recognition signal at step S202, the data service control module 222 executes the stock transaction program 20 at step S204.

The stock transaction program 20 then operates the network connection module 226 at step S206, so as to make a connection to the data communication module 238 of the W-PBX 110 and secure a data channel at step S208, thereby enabling the data communication. The stock transaction program 20 tries to log in to the stock transaction server 126 with a login ID and a password stored in the terminal 112 at step S210.

In the case where the login failed as a result of the check at the server 126 of the login ID and password, the stock transaction program 20 displays the login screen 22, and receives login information inputted from the user to retry the login of step S210. When the login succeeds, the stock transaction program 20 moves to step S212 to provide the stock transaction screen. That is, at step S212, the stock transaction program 20 obtains information of a requested stock quote, previously stored by the user, from the stock transaction server 126 to display the requested stock quote screen 24. Thereafter, the stock transaction program 20 is moved by the user to step S214 so as to provide the stock transaction main screen 26, where the program 20 interworks with the stock transaction server 126 to execute the stock transaction service.

In the meantime, in the case where the mobile communication terminal 112 has exited the precinct wireless network 100, the mobile communication terminal 112 does not receive the precinct network recognition signal any longer. Then, the network recognition/entrance notification receiving function 244 informs at step S216 the data service control module 222 that it is no longer receiving the precinct network recognition signal, so that the data service control module 222 terminates the stock transaction program 20 at step S218. In addition, the W-PBX interworking server 116 checks at step S220 through the location information checking function 236 of the W-PBX 110 that the terminal 112 has exited the precinct wireless network 100, and informs at step S222 the stock transaction server 126 of it so as to log the user out of the server 126.

Figure 13:
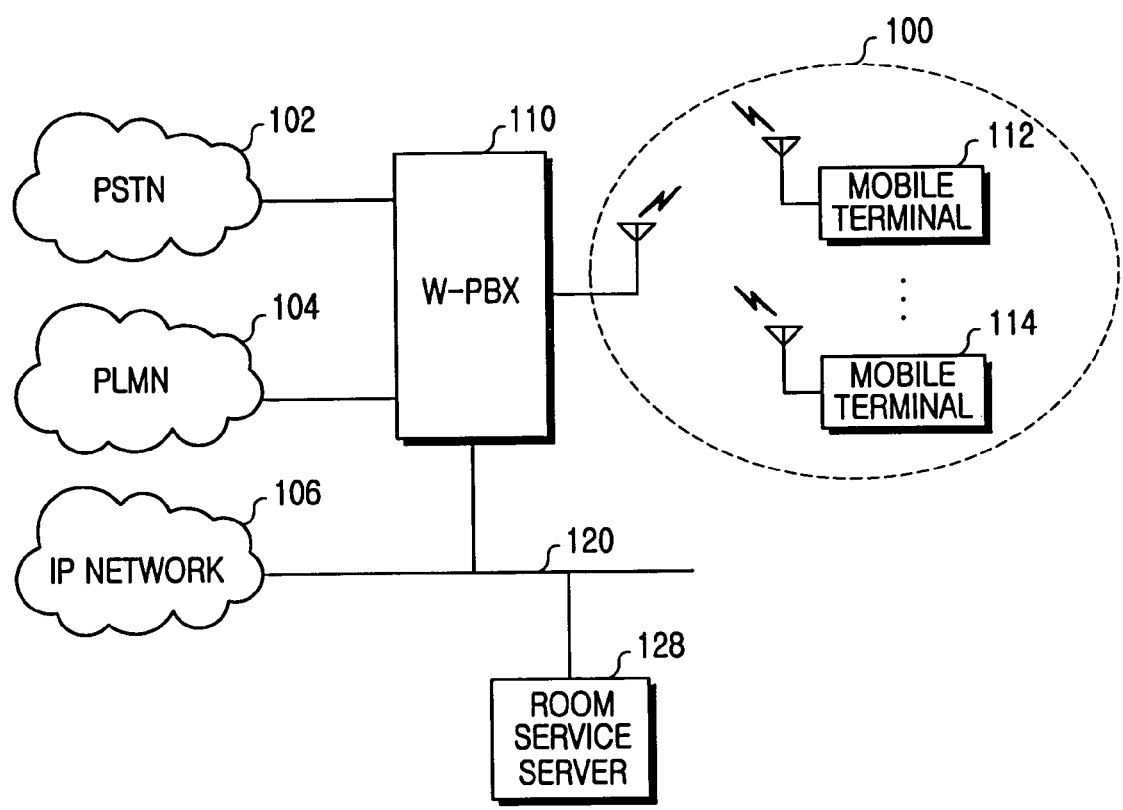
FIG. 13 shows the configuration of a network for providing a data service according to a third application example of the present invention.

FIG. 13 shows the configuration of a network for providing a data service according to the third application example of the present invention. This figure illustrates the case in which a room service, as a data service, is provided to a mobile communication terminal in a precinct wireless network 100 that has a precinct wireless network region in a hotel. As shown in this figure, a room service server 128, corresponding to the above data service server 118 of FIG. 1, has a connection to a LAN 120. The W-PBX interworking server 116 is omitted and not shown in this figure.

Figure 14:
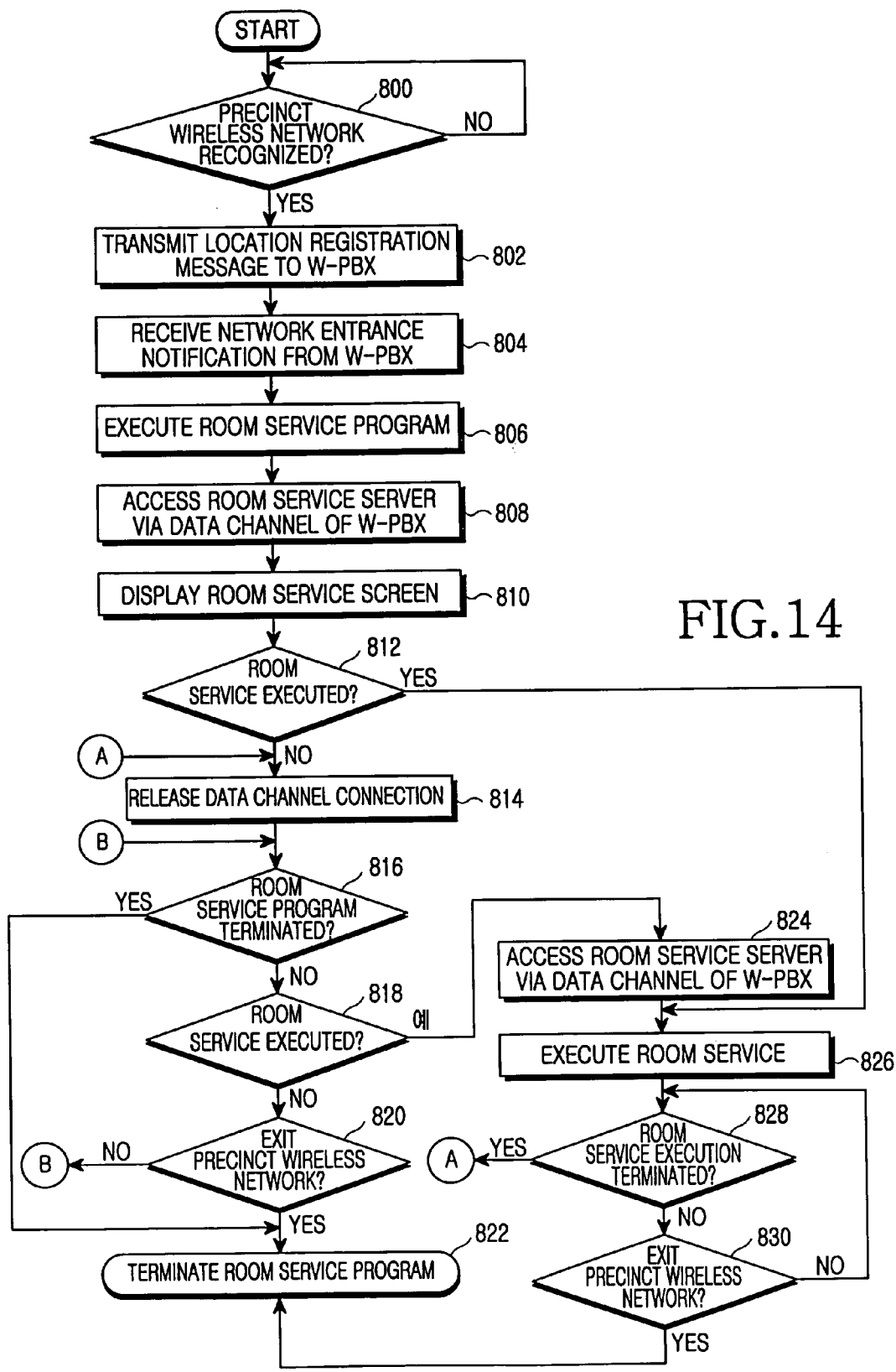
FIG. 14 is a flowchart illustrating the procedure performed by a mobile communication terminal to provide data services according to the third application example of the present invention.

In the third application example, the mobile communication terminal is provided with a room service program, corresponding to the above application program 224 of FIG. 3. The W-PBX 110 performs the same procedure as shown in FIG. 10, and the mobile communication terminal performs the procedure of steps 800 to 830 as shown in FIG. 14.

When a mobile communication terminal configured as shown in FIGS. 2 and 3 enters the precinct wireless network 100 from the outside thereof as the mobile communication terminals 112 and 114 of FIG. 13, it receives a precinct network recognition signal broadcasted from the W-PBX 110 to recognize the precinct wireless network 100. After recognizing the mobile communication terminal's entrance into the network 100 at step 800 as shown in FIG. 14, an MPU 200 as shown in FIG. 2 in the mobile communication terminal moves from step 800 to 802 to transmit a location registration message to the W-PBX 110.

Thereafter, the terminal receives at step 804 the precinct wireless network entrance notification from the W-PBX 110, and the data service control module 222 executes at step 806 a room service program corresponding to the application program 224. The room service program operates at step 808 the network connection module 226 to make a connection to the room service server 128 through a data channel of the W-PBX 110. At step 810, the room service program obtains data required for the user from the room service server 128 to display a room service screen through the display device 210. Thereafter, depending on the result of a check at step 812 as to whether the user has requested a room service execution, the procedure moves to either step 814 or step 826.

If the room service execution has been requested at step 812, the procedure moves to step 826. On the contrary, if there is no request to execute the room service, the data channel connection is released at step 814. Subsequently, it is checked at step 816 whether the room service program has been terminated, at step 818 whether there is a request to execute the room service, and at step 820 whether the terminal has exited the precinct wireless network 100.

If the room service program has not been terminated and the checked result of step 818 is that the terminal's user has requested a room service execution through the input device 208, the procedure moves from step 818 to 824. At step 824, the room service program operates the network connection module 226 to reconnect to the room service server 128 through a data channel of the W-PBX 110. At step 826, the room service program executes the room service by interworking with the room service server 128 according to a room service requested by the user.

It is then checked at step 828 whether the room service execution has been terminated, and at step 830 whether the terminal has exited the precinct wireless network 100. If the checked result at step 828 is that the room service execution has been terminated, the procedure moves from step 828 to step 814, and if the checked result at step 830 is that the terminal has exited the precinct wireless network 100, the procedure moves from step 830 to step 822 to terminate the room service program.

Also in the procedure of steps 816 to 820, if the checked result at step 820 is that the terminal has exited the precinct wireless network 100, the procedure moves to step 822 to terminate the room service program, and if the checked result at step 820 is that the terminal has not exited the precinct wireless network 100, the procedure moves again to step 816. Also in the case where the terminal's user selects the termination of the room service program at step 816, the procedure moves to step 822 to terminate the room service program.

As described above, according to the third application example, when a mobile communication terminal subscriber enters a hotel, a room service function is automatically executed, and thereafter, when the mobile communication terminal exits the hotel, the room service function is automatically terminated. This makes it convenient for the subscriber to use the room service using his or her mobile communication terminal.

Figure 15:
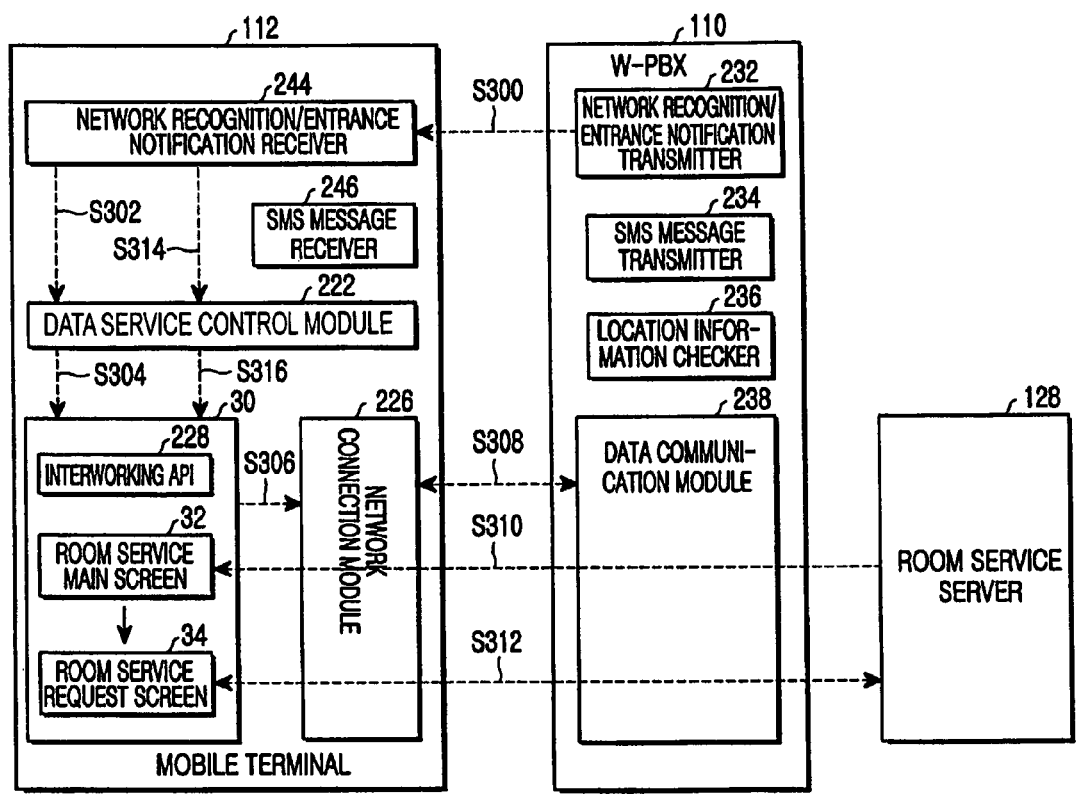
FIG. 15 illustrates a data service scenario according to the third application example.

An example scenario of the room service is illustrated in FIG. 15 for the sake of a better understanding of the room service according to the third application example as described above. In this figure, the same elements as those of FIG. 12 are denoted by the same reference numerals. A room service program 30 of the terminal 112 corresponds to the application program 224 of FIG. 3. A room service main screen 32 and a room service request screen 34 are provided by operating the data service execution module 230 of the room service program 30.

When the user of such a mobile communication terminal 112 as shown in FIG. 15 enters the precinct wireless network 100 while carrying the mobile communication terminal 112, the mobile communication terminal 112 receives at step S300 a precinct network recognition/entrance notification signal, transmitted by the notification signal transmitting function 232 of the W-PBX 100, through the notification signal receiving function 244.

When, in response to the reception, the notification signal receiving function 244 informs the data service control module 222 of the received precinct network recognition signal at step S302, the data service control module 222 executes the room service program 30 at step S304. The room service program 30 operates the network connection module 226 at step S306, so as to make a connection to the data communication module 238 of the W-PBX 110 and secure a data channel at step S308, thereby enabling the data communication. Then, at step S310, the room service program 30 obtains data required for the user of the mobile communication terminal 112 from the room service server 128 to display the room service main screen 32. Thereafter, the room service program 30 is moved by the user to step S312 so as to provide the room service request screen 34, where the program 30 interworks with the room service server 128 to execute the room service.

In the meantime, in the case where mobile communication terminal 112 has exited the precinct wireless network 100, the mobile communication terminal 112 does not receive the precinct network recognition signal any longer. Then, the network recognition/entrance notification receiving function 244 informs at step S314 the data service control module 222 that it is no longer receiving the precinct network recognition signal, so that the data service control module 222 terminates the room service program 30 at step S316.

Figure 16:
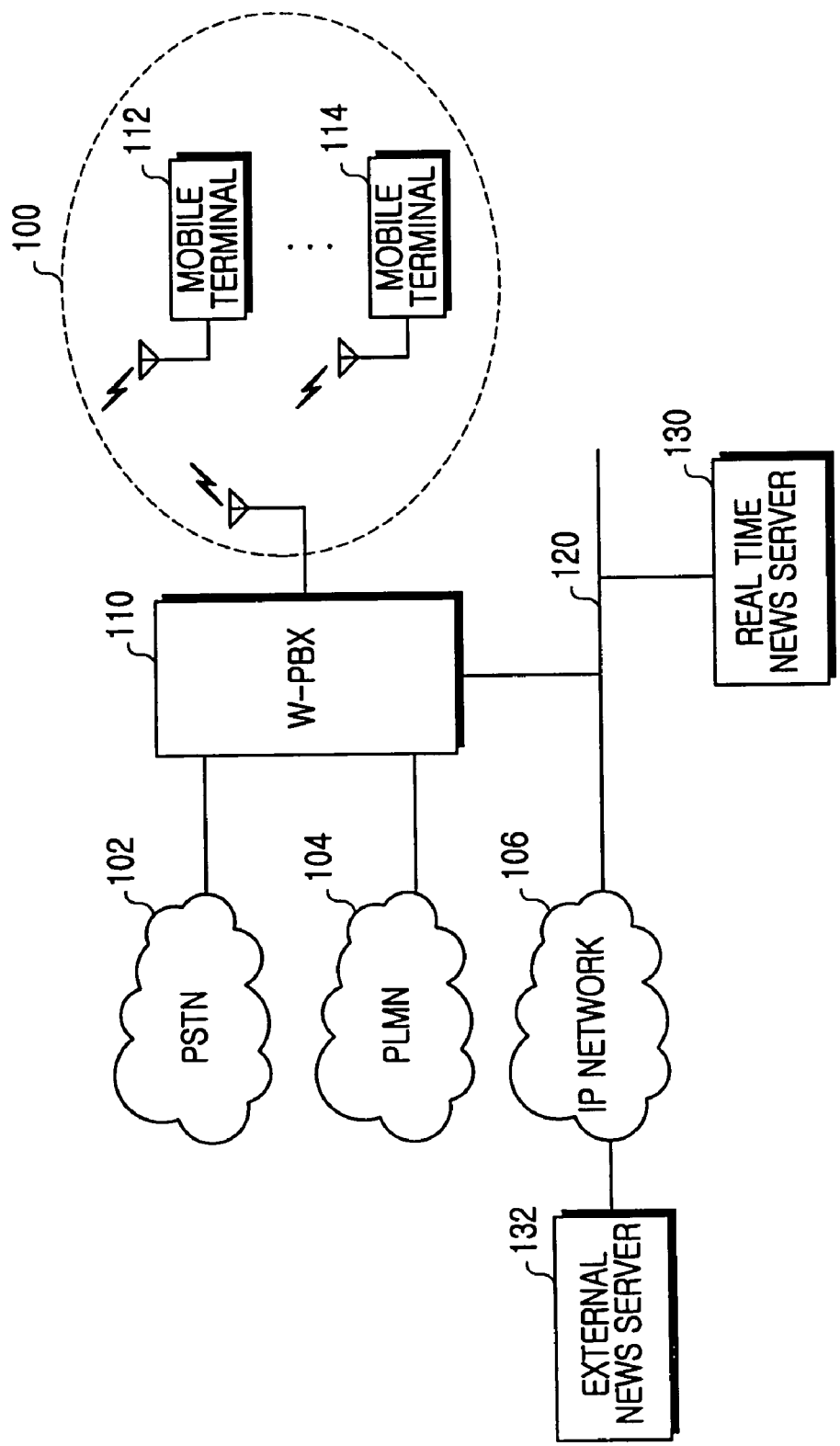
FIG. 16 shows the configuration of a network for providing a data service according to a fourth application example of the present invention.

FIG. 16 shows the configuration of a network for providing a data service according to the fourth application example of the present invention. This figure illustrates the case in which a real time news service, as a data service, is provided to a mobile communication terminal in a precinct wireless network 100 that has a precinct wireless network region in a specific zone such as newspaper company, broadcasting company, corporate and public buildings. As shown in this figure, a real time news server 130, corresponding to the above data service server 118 of FIG. 1, has a connection to a LAN 120 in order to provide real time news services. The W-PBX interworking server 116 is omitted and not shown in this figure. The real time news server 130 may interwork with an external news server 132, which provides a source of news as the news server of a news agency does, through an IP network 106.

In the fourth application example, the mobile communication terminal is provided with a real time news program, corresponding to the above application program 224 of FIG. 3. The W-PBX 110 performs the same procedure as shown in FIG. 10, and the mobile communication terminal performs the procedure of steps 900 to 930 as shown in FIG. 17.

When a mobile communication terminal configured as shown in FIGS. 2 and 3 enters the precinct wireless network 100 from the outside thereof as the mobile communication terminals 112 and 114 of FIG. 16, the mobile communication terminal receives a precinct network recognition signal broadcasted from the W-PBX 110 to recognize the precinct wireless network 100.

Figure 17:
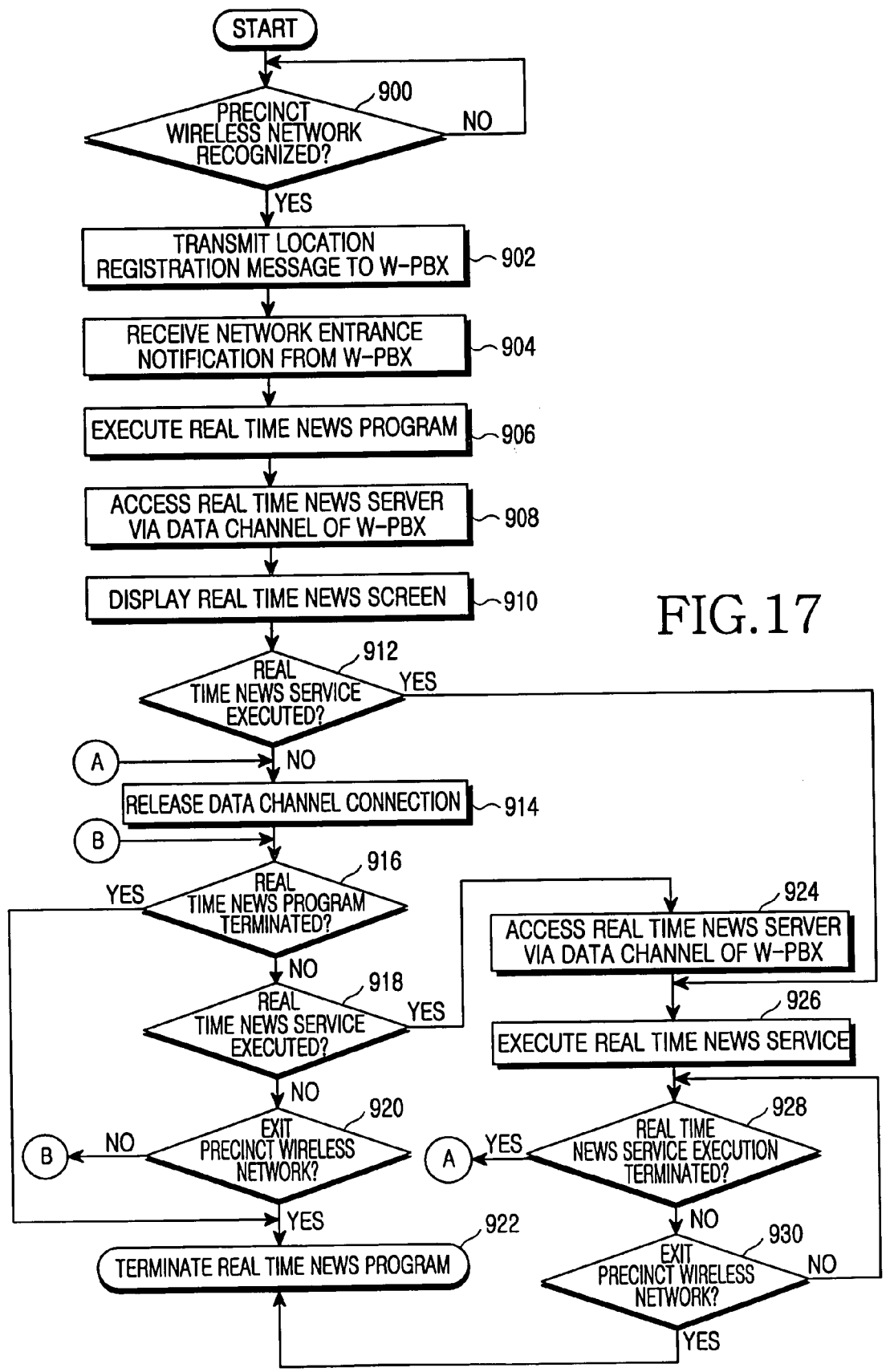
FIG. 17 is a flowchart illustrating the procedure performed by a mobile communication terminal to provide data services according to the fourth application example of the present invention.

After recognizing the mobile communication terminal's entrance into the network 100 at step 900 as shown in FIG. 17, an MPU 200 as shown in FIG. 2 in the mobile communication terminal moves from step 900 to 902 to transmit a location registration message to the W-PBX 110. Thereafter, the mobile communication terminal receives at step 904 the precinct wireless network entrance notification from the W-PBX 110, and the data service control module 222 automatically executes at step 906 a real time news program corresponding to the application program 224.

The real time news program operates at step 908 the network connection module 226 to make a connection to the real time news server 130 through a data channel of the W-PBX 110. At step 910, the real time news program obtains news data from the real time news server 130 to display a real time news screen through the display device 210.

Thereafter, depending on the result of a check at step 912 as to whether a real time news service has been executed as the user desires, the procedure moves to either step 914 or step 926. If the real time news service execution has been requested at step 912, the procedure moves to step 926.

On the contrary, if there is no request to execute the real time news service, the data channel connection is released at step 914. Subsequently, it is checked at step 916 whether the real time news program has been terminated, at step 918 whether there is a request to execute the real time news service (or whether a period of time preset by the user has lapsed), and at step 920 whether the terminal has exited the precinct wireless network 100. If it is checked at step 916 that the real time news program has been terminated, such as in the case where the terminal's user has selected the termination of the real time news program, the process moves to step 922 to terminate the real time news program.

If it is checked at step 916 that the real time news program has not been terminated and the checked result of step 918 is that the terminal's user has requested a real time news service execution (or that the preset period of time has lapsed), the procedure moves from step 918 to 924. At step 924, the real time news program operates the network connection module 226 to reconnect to the real time news server 130 through a data channel of the W-PBX 110. Then, at step 926, the real time news program executes the real time news service by interworking with the real time news server 130.

The reason why, when the preset time of period has lapsed, the program opens the data channel connection to display the real time news screen even though the user has not requested the news service execution is to update the news content.

Thereafter, it is checked at step 928 whether the real time news service execution has been terminated, and at step 930 whether the terminal has exited the precinct wireless network 100. If the checked result at step 928 is that the real time news service execution has been terminated, the procedure moves from step 928 to step 914, or if the checked result at step 928 is that the real time news service execution has not been terminated, the procedure moves from step 928 to step 930.

If the checked result at step 930 is that the terminal has exited the precinct wireless network 100, the procedure moves from step 930 to step 922 to terminate the real time news program. If the checked result at step 930 is that the terminal has not exited the precinct wireless network 100, the procedure moves from step 930 back to step 928.

Also in the procedure of steps 916 to 920, if the checked result at step 920 is that the terminal has exited the precinct wireless network 100, the procedure moves to step 922 to terminate the real time news program, or if the checked result at step 920 is that the terminal has exited the precinct wireless network 100, the procedure moves back to step 916. Here, in the case where the terminal's user has selected the termination of the real time news program at step 916, the procedure moves to step 922 to terminate the real time news program.

As described above, according to the fourth application example, when the subscriber of a mobile communication terminal visits a specific zone (wireless precinct) such as newspaper company, broadcasting company, corporate and public buildings, a real time news service function is automatically executed, and thereafter, when the terminal exits the specific zone, the real time news service function is automatically terminated. This makes it convenient for the subscriber to use the real time news service using his or her terminal.

Figure 18:
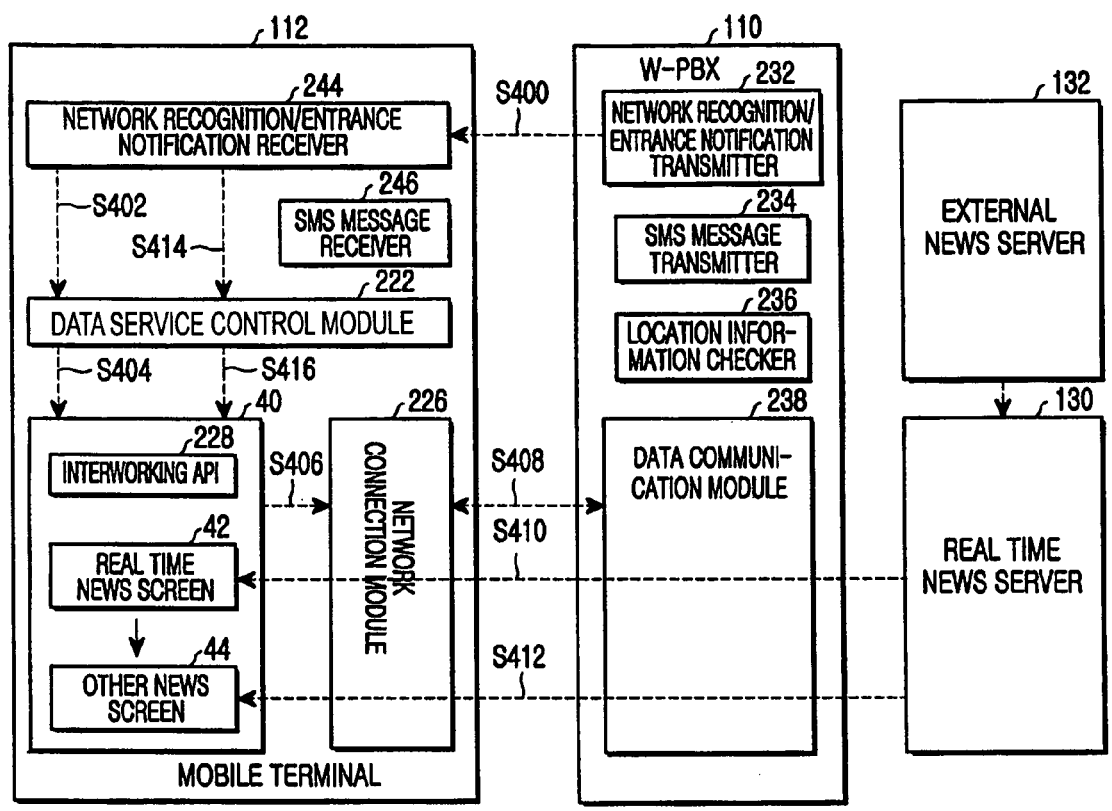
FIG. 18 illustrates a data service scenario according to the fourth application example.

An example scenario of the real time news service is illustrated in FIG. 18 for the sake of a better understanding of the real time news service according to the fourth application example as described above. In this figure, the same elements as those of FIG. 12 are denoted by the same reference numerals. A real time news program 40 of the terminal 112 corresponds to the application program 224 of FIG. 3. A real time news screen 42 and other news screen 44 are provided by operating the data service execution module 230 of the real time news program 40.

When the user of such a terminal 112 as shown in FIG. 18 enters the precinct wireless network 100 while carrying the terminal 112, the terminal 112 receives at step S400 a precinct network recognition/entrance notification signal, transmitted by the notification signal transmitting function 232 of the W-PBX 100, through the notification signal receiving function 244.

When, in response to the reception, the notification signal receiving function 244 informs the data service control module 222 of the received precinct network recognition signal at step S402, the data service control module 222 executes the real time news program 40 at step S404. The real time news program 40 operates the network connection module 226 at step S406, so as to make a connection to the data communication module 238 of the W-PBX 110 and secure a data channel at step S408, thereby enabling the data communication.

Then, at step S410, the real time news program 40 obtains news data desired by the user of the terminal 112 (i.e., news data in a category preset by the user) from the real time news server 130 to display the real time news screen 42. Here, as the user requests, the real time news program 40 may receive a source news from the external news server 132 through the real time news server 130 to show the source news to the user. In addition, at step S412, the program 40 may obtain other news data, selected by the user of the terminal 112, from the real time news server 130 to show it to the user.

In the meantime, in the case where the mobile communication terminal 112 has exited the precinct wireless network 100, the terminal 112 does not receive the precinct network recognition signal any longer. Then, the network recognition/entrance notification receiving function 244 informs at step S414 the data service control module 222 that it is no longer receiving the precinct network recognition signal, so that the data service control module 222 terminates the real time news program 40 at step S416.

As apparent from the above description, a method and system for providing data services to mobile communication terminals, and a mobile communication terminal therefor according to the present invention have the following advantages. A data service application program employed in a mobile communication terminal is automatically executed when the terminal enters a precinct wireless network, and it is automatically terminated when the terminal exits the network, which makes it convenient for the user to use the data service. In addition, the terminal opens a data channel connection with the precinct wireless network only if a real data service is currently executed, otherwise it releases the data channel connection with the precinct wireless network, even though the data service function is in operation. This prevents an unnecessary load on mobile communication network resources. Further, since a specific data service according to the characteristics of the zone of a precinct wireless network can be provided free or at a fixed rate to a mobile communication terminal user registered as a user of the precinct wireless network, it is possible to secure new customers or improve income effectively.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. In particular, although the embodiments have been described with reference to examples characterized both in that a data service application program according to the present invention is automatically executed when a mobile communication terminal enters a precinct wireless network, and it is automatically terminated when the terminal exits the network, and in that the terminal opens a data channel connection to the precinct wireless network only if a real data service is currently executed, such characterized examples may be selectively applied as required. Such a selective application is also possible with respect to the login/logout functions described above. In addition, although the present invention has been described with reference to examples where a data service is provided only to a mobile communication terminal subscriber registered in the precinct wireless network, it may also be provided to any subscriber of a mobile communication terminal with a suitable data service function, irrespective of whether he or she is a registered subscriber. Accordingly, the scope of the present invention should not be limited to the description of the embodiments, but defined by the accompanying claims as well as equivalents thereof.

What is claimed is:

1. A method of providing at least one data service to a mobile communication terminal in a precinct wireless network, said method comprising steps of:
   automatically executing an application program corresponding to a predetermined data service function of the mobile communication terminal, when the mobile communication terminal enters the precinct wireless network;
   making a connection to a data service server through a data channel of the precinct wireless network to execute the data service;
   automatically terminating the application program, when the terminal exits the precinct wireless network;
   releasing said data channel;
   checking for a termination request input by a user of the mobile communication terminal, to terminate the application program after releasing said data channel;
   checking for a data service execution request made by the user, when it is determined that the user has not input the termination request;
   making a connection to the data service server through one data channel of the precinct wireless network to execute said data service in response to the data service execution request made by the user; and
   performing said data service until said user terminates said data service or until said mobile communication terminal exits the precinct wireless network.

2. The method as set forth in claim 1, wherein said data service is provided only to a registered mobile communication terminal subscriber.

3. The method as set forth in claim 1, wherein a subscriber of the mobile communication terminal can set, and release, the automatic execution of the application program.

4. The method as set forth in claim 3, wherein the subscriber can set, and release, the automatic execution of the application program for each of a plurality of data services.

5. The method as set forth in claim 1, further comprising a step of returning to said step of releasing said data channel of the precinct wireless network when the user terminates said data service.

6. The method as set forth in claim 1, wherein the data service is a predetermined one of a messenger service, a stock transaction service, a room service and a real time news service.

7. The method as set forth in claim 1, said step of automatically executing a application program of the mobile communication terminal, when the mobile communication terminal enters the precinct wireless network, comprising steps of:
   recognizing, by the mobile communication terminal, its entrance into in the precinct wireless network in response to precinct network recognition signals transmitted by a W-PBX (Wireless Private Branch Exchange) of the precinct wireless network;
   transmitting a location registration message from the mobile communication terminal to the W-PBX (Wireless Private Branch Exchange) when the mobile communication terminal recognizes it entrance into the precinct wireless network
   providing, by the W-PBX (Wireless Private Branch Exchange), notification to the mobile communication terminal of its entrance into the precinct wireless network in response to said location registration message, if the mobile communication terminal is registered in the precinct wireless network, the application program of the mobile communication terminal being automatically executed in response to the notification.

8. The method as set forth in claim 1, further comprising a step of performing a login process prior to the step of releasing said data channel, the login process logging the mobile communication terminal into the data service server.

9. The method as set forth in claim 8, the login process comprising steps of:
   determining whether the login process was successful;
   displaying on a display of the mobile communication terminal, a screen corresponding to the executed application program, when it is determined that the login process was successful;
   determining whether the user of the mobile communication terminal executes the data service corresponding to the displayed screen; and
   performing the data channel releasing step when it is determined that the user of the mobile communication terminal does not execute the data service corresponding to the displayed screen.

10. The method as set forth in claim 9, the login process further comprising steps of:
    displaying a login screen and waiting for user input of login information when it is determined that the login process was not successful;
    checking for input of a termination request, by the user, to terminate the application program;
    terminating the application program, when it is determined the user has input the termination request;
    inputting login information input by the user in response to the login screen, when it is determined the user has not input the termination request, and returning to the step of determining whether the login process was successful.

11. The method as set forth in claim 9, wherein the application program is a messenger program, the data service is a messenger service and the data service server is a messenger server, the step of performing said data service further comprising steps of:
    requesting message communication from the messenger server; and
    executing the message communication.

12. The method as set forth in claim 9, wherein the application program is a stock transaction program, the data service is a stock transaction service and the data service server is a stock transaction server, the step of performing said data service comprising executing the stock transaction service.

13. The method as set forth in claim 8, further comprising steps of: logging out of the data service server, when it is determined that the user has input the termination request; and
    terminating the application program after logging out of the data service server.

14. The method as set forth in claim 1, further comprising steps of:
    checking for an exit of the mobile communication terminal from the precinct wireless network, when it is the user does not input the data service execution request;

returning to the step of checking for input of a termination request by the user, when it is checked that the mobile communication terminal has not exited the precinct wireless network; and terminating the application program, when it is checked that the mobile communication terminal has exited the precinct wireless network.

15. The method as set forth in claim 1, wherein the application program is a room service program, the data service is a room service and the data service server is a room service server, the method further comprising a step of displaying a room service screen on a display screen of the mobile communication terminal after making the connection to a data service server through the data channel.

16. The method as set forth in claim 15, further comprising steps of:

determining whether a user of the mobile communication terminal executes the room service;

releasing said data channel when it is determined that the user has not executed the room service;

checking for input of a room service program termination request, by the user, to terminate the room service program after releasing said data channel;

terminating the application program, when it is checked that the user inputs the room service program termination request;

checking for a room service execution request made by the user, when it is determined that the user has not input the room service program termination request;

making a connection to the room service server through one data channel of the precinct wireless network to execute said room service in response to the room service execution request made by the user; and performing said room service until said user terminates said room service or until said mobile communication terminal exits the precinct wireless network.

17. The method as set forth in claim 1, wherein the application program is a real time news program, the data service is a real time news service and the data service server is a real time news server, the method further comprising a step of displaying a real time news service screen on a display screen of the mobile communication terminal after making the connection to a data service server through the data channel.

18. The method as set forth in claim 17, further comprising steps of:

determining whether a user of the mobile communication terminal executes the real time news service;

releasing said data channel when it is determined that the user has not executed the real time news service;

checking for input of a real time news program termination request, by the user, to terminate the real time news program after releasing said data channel;

checking for a real time news service execution request made by the user, when it is determined that the user has not input the real time news program termination request;

making a connection to the real time news server through one data channel of the precinct wireless network to execute said real time news service in response to the real time news service execution request made by the user; and performing said real time news service until said user terminates said real time news service or until said mobile communication terminal exits the precinct wireless network.

19. The method as set forth in claim 17, further comprising steps of:

determining whether a user of the mobile communication terminal executes the real time news service;

releasing said data channel when it is determined that the user has not executed the real time news service;

checking for input of a real time news program termination request, by the user, to terminate the real time news program after releasing said data channel;

checking for elapse of a preset time period, when it is determined that the user has not input the real time news program termination request;

making a connection to the real time news server through one data channel of the precinct wireless network, after the preset time period has elapsed, to execute said real time news service; and performing said real time news service until said user terminates said real time news service or until said mobile communication terminal exits the precinct wireless network.

20. A system for providing at least one data service to a mobile communication terminal in a precinct wireless network utilizing a W-PBX (Wireless Private Branch Exchange) providing a mobile communication service to the mobile communication terminal, the system comprising:

the mobile communication terminal automatically executing an application program corresponding to a predetermined data service function, which has been set to be automatically executed upon receipt of a precinct wireless network entrance notification message from the W-PBX (Wireless Private Branch Exchange), upon entering the precinct wireless network, the mobile communication terminal including a microprocessor comprising:

a data service control module automatically executing the application program upon receipt of said precinct wireless network entrance notification message and automatically terminating the application program when the mobile communication terminal exits the precinct wireless network;

the application program also being executable by a subscriber of the mobile communication terminal; and a network connection module for making a data channel connection to the W-PBX (Wireless Private Branch Exchange), wherein the application program comprises:

a data service execution module for executing a predetermined data service and for making a connection to a data service server through the network connection module, and an interworking API (Application Program Interface) for interworking with the data service control module to operate the network connection module and the data service execution module;

upon exiting the precinct wireless network, the mobile communication terminal automatically terminating the application program.

21. The system as set forth in claim 20, further comprising a data service server, connected to the W-PBX (Wireless Private Branch Exchange) through a LAN (Local Area Network), for providing the data service to the mobile communication terminal through the W-PBX (Wireless Private Branch Exchange), wherein said data service is provided only to a registered mobile communication terminal subscriber.

22. The system as set forth in any one of claims 20, wherein a subscriber of the mobile communication terminal can set, and release, the automatic execution of the application program.

23. The system as set forth in claim 20, said data service server corresponding to a messenger server, a stock transaction server, a room service server or a real time news server.

24. The system as set forth in claim 20, the microprocessor comprising network recognition/entrance notification receiving function for receiving said precinct wireless network entrance notification message and, in response thereto, controlling said data service control module to automatically execute the application program.

25. The system as set forth in claim 20, wherein the application program is a messenger program, the data service is a messenger service and the data service server is a messenger server, the messenger program, using stored login information, attempting to log the mobile communication terminal into the messenger server over the data channel when the messenger program is executed, the mobile communication terminal further comprising a display for displaying a login screen utilized by the subscriber to manually input login information when the login attempted by the messenger program fails.

26. The system as set forth in claim 25, wherein the messenger program displays a messenger screen after successfully logging the mobile communication terminal into the messenger server, checks for messenger transmission or reception and, when no messenger transmission or reception is detected, releases the data channel.

27. The system as set forth in claim 20, wherein the application program is a stock transaction program, the data service is a stock transaction service and the data service server is a stock transaction server, the stock transaction program, using stored login information, attempting to log the mobile communication terminal into the stock transaction server over the data channel when the messenger program is executed, the mobile communication terminal further comprising a display for displaying a login screen utilized by the subscriber to manually input login information when the login attempted by the stock transaction program fails.

28. The system as set forth in claim 27, wherein the stock transaction program displays a stock transaction screen after successfully logging the mobile communication terminal into the messenger server, checks for stock transaction communication and, when no stock transaction communication is detected, releases the data channel.

29. The system as set forth in claim 20, wherein the application program is a room service program, the data service is a room service and the data service server is a room service server, the mobile communication terminal further comprising a display for displaying a room service screen after making the connection to a data service server through the data channel.

30. The system as set forth in claim 20, wherein the application program is a real time news program, the data service is a real time news service and the data service server is a real time news server, the mobile communication terminal further comprising a display for displaying a real time news screen after making the connection to a data service server through the data channel.

31. A system for providing at least one data service to a mobile communication terminal in a precinct wireless network, the system comprising:

the mobile communication terminal transmitting a location registration message, for registering its location, to a W-PBX (Wireless Private Branch Exchange), when it enters the precinct wireless network;

the W-PBX (Wireless Private Branch Exchange) transmitting a precinct wireless network entrance notification message for notifying the mobile communication terminal of its entrance into the precinct wireless network, in response to the location registration message and if the mobile communication terminal is registered in the precinct wireless network, said W-PBX (Wireless Private Branch Exchange) providing a mobile communication service to the mobile communication terminal;

a W-PBX (Wireless Private Branch Exchange) interworking server, connected to the W-PBX (Wireless Private Branch Exchange) through the LAN (Local Area Network), for requesting the W-PBX (Wireless Private Branch Exchange) to notify another mobile communication terminal, which enters the precinct wireless network and has a data service program executed, of a data service execution request made by the mobile communication terminal to said another mobile communication terminal, in response to the data service execution request from the mobile communication terminal, said W-PBX (Wireless Private Branch Exchange) notifying said another mobile communication terminal of the data service execution request, when a data service execution notification request to said another mobile communication terminal is received from the W-PBX (Wireless Private Branch Exchange) interworking server; and the mobile communication terminal automatically executing an data service application program corresponding to a predetermined data service function, which has been set to be automatically executed upon receipt of the precinct wireless network entrance notification message from the W-PBX (Wireless Private Branch Exchange), and upon exiting the precinct wireless network, the mobile communication terminal automatically terminating the data service application program.

32. The system as set forth in claim 31, further comprising a data service server, connected to the W-PBX (Wireless Private Branch Exchange) through a LAN (Local Area Network), for providing the data service to the mobile communication terminal through the W-PBX (Wireless Private Branch Exchange).

33. The system as set forth in claim 32, wherein the mobile communication terminal logs in to the data service server when the data service application program is executed, and logs out of the data service server when the data service application program is terminated.

34. The system as set forth in claim 33, wherein the mobile communication terminal releases a data channel connection with the W-PBX (Wireless Private Branch Exchange) after the login, and releases the data channel connection with the W-PBX (Wireless Private Branch Exchange) after terminating the data service program execution.

35. The system as set forth in claim 31, wherein, if the mobile communication terminal exits the precinct wireless network, the W-PBX (Wireless Private Branch Exchange) notifies the data service server, through the W-PBX (Wireless Private Branch Exchange) interworking server, of the mobile communication terminal's exit from the precinct wireless network, and, in response to this notification, the data service server performs a logout process for the mobile communication terminal.

36. The system as set forth in claim 31, wherein the notification of the data service execution request to said another mobile communication terminal is performed by an SMS (Short Message Service).

37. The system as set forth in claim 31, wherein the notification of the data service execution request to said another mobile communication terminal is performed only when communication approval between said another mobile communication terminal with the requesting mobile communication terminal has been preset in said another mobile communication terminal.

* * * * *